(12) United States Patent
Hiwatashi et al.

(10) Patent No.: US 10,688,999 B2
(45) Date of Patent: *Jun. 23, 2020

(54) VEHICLE CONTROL DEVICE

(71) Applicant: Mazda Motor Corporation, Aki-gun, Hiroshima (JP)

(72) Inventors: Keiichi Hiwatashi, Aki-gun (JP); Yasunori Takahara, Hiroshima (JP); Daisaku Ogawa, Hiroshima (JP); Daisuke Umetsu, Hiroshima (JP); Osamu Sunahara, Hiroshima (JP); Chikako Ohisa, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 257 days.

This patent is subject to a terminal disclaimer.

(21) Appl. No.: 15/701,652

(22) Filed: Sep. 12, 2017

(65) Prior Publication Data

US 2018/0072317 A1 Mar. 15, 2018

(30) Foreign Application Priority Data

Sep. 14, 2016 (JP) .................................. 2016-179161

(51) Int. Cl.
*B60W 30/188* (2012.01)
*F02D 41/02* (2006.01)
(Continued)

(52) U.S. Cl.
CPC ....... *B60W 30/1882* (2013.01); *F02D 11/105* (2013.01); *F02D 41/0005* (2013.01);
(Continued)

(58) Field of Classification Search
CPC ..... B60W 30/1882; B60W 2710/0666; B60W 2710/0605; B60W 2520/14;
(Continued)

(56) References Cited

U.S. PATENT DOCUMENTS 3,217,846 A * 11/1965 Smirl .................... B60W 10/02
477/82
4,744,031 A * 5/1988 Takeda .................. B60W 10/06
477/63
(Continued)

FOREIGN PATENT DOCUMENTS

JP H10166905 A 6/1998
JP 2000108914 * 10/1998 ............... B62D 6/00
(Continued)

*Primary Examiner* — Khoi H Tran
*Assistant Examiner* — Kyle T Johnson
(74) *Attorney, Agent, or Firm* — Alleman Hall Creasman & Tuttle LLP

(57) ABSTRACT

A vehicle control device includes a drive source for generating torque as driving force that causes a vehicle to travel, a drive source control mechanism for controlling the torque generation by the drive source, a driving force transmission mechanism for transmitting the torque to vehicle wheels, an engageable element provided in the transmission mechanism, and a processor configured to execute an engagement state change control in which an engagement state of the engageable element is changed, a vehicle attitude controlling module for controlling attitude of the vehicle by driving the drive source control mechanism to reduce the torque so as to decelerate the vehicle, when a condition is satisfied, the condition being that the vehicle is traveling and a steering angle related value increases, and an engagement state change restricting module for restricting the execution of the engagement state change control while the vehicle attitude control is executed.

20 Claims, 11 Drawing Sheets

(51) Int. Cl.
*F02D 41/00* (2006.01)
*F02D 11/10* (2006.01)
*F02D 37/02* (2006.01)
*F02D 41/26* (2006.01)

(52) U.S. Cl.
CPC ....... *F02D 41/021* (2013.01); *B60W 2520/10* (2013.01); *B60W 2520/14* (2013.01); *B60W 2710/0605* (2013.01); *B60W 2710/0666* (2013.01); *F02D 37/02* (2013.01); *F02D 41/26* (2013.01); *F02D 2041/002* (2013.01); *F02D 2200/602* (2013.01); *F02D 2250/18* (2013.01); *Y02T 10/42* (2013.01)

(58) Field of Classification Search
CPC ......... B60W 2520/10; B60W 2540/18; B60W 2540/10; B60W 2710/0616; B60W 2710/06; B60W 40/105; B60W 30/02; B60W 10/06; F02D 11/105; F02D 2250/18; F02D 2200/602; F02D 41/26; F02D 37/021; F02D 41/0005; F02D 41/02; F02D 2041/002; Y02T 10/42
See application file for complete search history.

(56) References Cited

U.S. PATENT DOCUMENTS

| | | | |
|---|---|---|---|
| 6,033,340 A * | 3/2000 | Amendt | B60W 10/02 477/77 |
| 6,077,190 A * | 6/2000 | Tabata | B60T 8/1755 477/169 |
| 6,182,000 B1 * | 1/2001 | Ohta | B60K 31/0058 180/170 |
| 6,208,927 B1 | 3/2001 | Mine et al. | |
| 6,217,477 B1 * | 4/2001 | Nobumoto | B60W 10/06 477/107 |
| 6,553,297 B2 | 4/2003 | Tashiro et al. | |
| 10,300,914 B2 | 5/2019 | Okada et al. | |
| 2005/0217921 A1 * | 10/2005 | Mori | B60K 17/35 180/433 |
| 2005/0218718 A1 | 10/2005 | Iwatsuki et al. | |
| 2005/0222739 A1 * | 10/2005 | Mori | B60K 23/0808 701/69 |
| 2006/0289227 A1 * | 12/2006 | Chino | B62D 1/163 180/402 |
| 2011/0295480 A1 * | 12/2011 | Shimada | B60K 17/35 701/70 |
| 2017/0175659 A1 * | 6/2017 | Sunahara | F02D 41/0087 |
| 2018/0072317 A1 * | 3/2018 | Hiwatashi | F02D 41/021 |
| 2018/0086349 A1 * | 3/2018 | Hiwatashi | B60W 10/02 |
| 2018/0273024 A1 * | 9/2018 | Umetsu | B60W 30/02 |

FOREIGN PATENT DOCUMENTS

| | | |
|---|---|---|
| JP | 2003200764 A | 7/2003 |
| JP | 2014166014 A | 9/2014 |
| JP | 2015089251 A | 5/2015 |

* cited by examiner

VEHICLE CONTROL DEVICE

BACKGROUND

The present disclosure relates to a vehicle control device, and more particularly to a vehicle control device that achieves a desired vehicle attitude (vehicle behavior) by performing an engine control.

Conventionally, devices which control the behavior of a vehicle to a safer direction when the behavior of the vehicle becomes unstable due to a slip, etc. (such as an antiskid brake system (ABS)), are known. For example, devices which detect that a behavior such as understeering or oversteering occurs with the vehicle during cornering, etc. of the vehicle, and apply a suitable deceleration to the wheels so that the behavior is controlled, are known.

Meanwhile, a vehicle movement controller is known, that adjusts a deceleration during cornering to control loads applied to front wheels which are steerable wheels so that a series of operations by a vehicle driver (breaking, steering-in, accelerating, steering-back, etc.) during cornering of a vehicle in a normal traveling state become natural and stable, unlike the above control executed for a safety improvement in the traveling state where the behavior of the vehicle becomes unstable.

Further, JP2014-166014A discloses a behavior control device for a vehicle which reduces a driving force (torque) of the vehicle according to a yaw-rate related amount corresponding to a steering operation by a vehicle driver (e.g., yaw acceleration) to quickly decelerate the vehicle when the driver starts the steering operation (vehicle attitude control) so that a sufficient load is quickly applied to front wheels which are steerable wheels. According to this behavior control device, a frictional force between the front wheels and a road surface increases and a cornering force of the front wheels increases by quickly applying the loads to the front wheels when the steering operation is started. Therefore, turnability of the vehicle in an early stage of curve entry improves, and a response to the steering-in operation (steering stability) improves. Thus, a vehicle behavior intended by the driver is achieved.

Incidentally, driving force transmission mechanisms that transmit a driving force of a vehicle to vehicle wheels are conventionally provided with various kinds of engageable elements, and change an engagement state of each engageable element according to an operating state of the vehicle (engagement state change control). If this engagement state change control and the vehicle attitude control, such as that described in JP2014-166014A, are simultaneously executed, the following problem may occur. That is, if the engagement state of the engageable element is changed by the engagement state change control while the driving force of the vehicle is reduced by the vehicle attitude control, the torque cannot be reduced sufficiently to control the vehicle attitude and a desired vehicle attitude may not be achieved. In other words, the steering stability may not suitably be improved. On the other hand, if the driving force of the vehicle is reduced by the vehicle attitude control while the engagement state of the engageable element is changed by the engagement state change control, the engagement states may not be changed quickly or stably.

Here, a situation where the driving force transmission mechanism includes a torque converter provided with a lockup clutch and the engageable element is the lockup clutch is described as one example. The engagement state of the lockup clutch is preferably in a fully engaged state when considering fuel consumption efficiency, while, in a situation or an operating range in which acceleration performance improvement, vibration reduction, etc. are required, the engagement state is preferably in a slip state or a fully released state. Therefore, the engagement state of the lockup clutch is generally controlled according to the operating state of the vehicle, such as an accelerator opening, a vehicle speed, etc. Here, if the engagement state of the lockup clutch is changed (particularly, the engagement state is loosened) due to a change in the operating state while the vehicle attitude control is executed, sufficient torque reduction for the vehicle attitude control cannot be performed and the desired vehicle attitude cannot be achieved. On the other hand, if the vehicle attitude control is executed while the engagement state of the lockup clutch is changed due to the change in the operating state, fuel consumption reduction, acceleration performance improvement, vibration reduction, etc. cannot suitably be achieved.

SUMMARY

The present disclosure is made in view of solving the issues of the conventional arts described above, and aims to provide a control device of a vehicle, that suitably prevents an inconvenience caused by executing both a vehicle attitude control in which a torque of a drive source is reduced to decelerate the vehicle according to a steering operation, and an engagement state change control in which an engagement state of an engageable element provided to a driving force transmission mechanism for transmitting the torque to vehicle wheels is changed.

According to one aspect of the present disclosure, a vehicle control device is provided, that includes a drive source for generating torque as a driving force that causes a vehicle to travel, a drive source control mechanism for controlling the torque generation by the drive source, a driving force transmission mechanism for transmitting the generated torque to vehicle wheels, an engageable element provided in the driving force transmission mechanism, and a processor configured to execute an engagement state change controlling module for executing an engagement state change control in which an engagement state of the engageable element is changed, a vehicle attitude controlling module for controlling an attitude of the vehicle by driving the drive source control mechanism to reduce the generated torque so as to decelerate the vehicle, when a condition is satisfied, the condition being that the vehicle is traveling and a steering angle related value that is related to a steering angle of a steering device increases, and an engagement state change restricting module for restricting the execution of the engagement state change control while the vehicle attitude control is executed.

According to this configuration, since the execution of the engagement state change control during the vehicle attitude control is restricted, the torque reduction for controlling the vehicle attitude is secured suitably compared to a case where the execution of the engagement state change control during the vehicle attitude control is not restricted. Therefore, it is reliably prevented that the suitable torque reduction for controlling the vehicle attitude ("torque" used here means the torque applied to the vehicle wheels) cannot be performed due to the intervention of the engagement state change control during the vehicle attitude control. Thus, the vehicle attitude is controlled with high responsiveness to a steering operation by a vehicle driver, and a vehicle behavior intended by the driver is accurately achieved. That is, steering stability is suitably improved.

The engagement state change restricting module may perform at least one of delaying an execution timing of the engagement state change control, prohibiting the engagement state change control, regulating a changing speed of the engagement state in the engagement state change control, and regulating a change amount of the engagement state in the engagement state change control.

According to this configuration, the engagement state change control is suitably restricted during the vehicle attitude control.

The vehicle attitude controlling module may reduce the torque based on the engagement state of the engageable element when the condition is satisfied.

As described above, the vehicle attitude controlling module reduces the torque based on the engagement state of the engageable element when an execution condition of the vehicle attitude control is satisfied (in other words, almost at the start of the vehicle attitude control). Accordingly, if the engagement state of the engageable element is changed by the engagement state change control during the vehicle attitude control, the torque reduced by the vehicle attitude controlling module becomes unsuitable for the engagement state after the change. Thus, the above-described suitable torque reduction for controlling the vehicle attitude cannot be achieved. In this regard, according to this configuration, since the execution of the engagement state change control is restricted during the vehicle attitude control, such an issue is suitably solved.

The driving force transmission mechanism may include a torque converter provided with a lockup clutch. The engageable element may be the lockup clutch.

The engagement state change controlling module may execute the engagement state change control based on a vehicle speed related value that is a parameter related to a vehicle speed and an accelerator opening related value that is a parameter related to an accelerator opening.

According to this configuration, the engagement state of the engageable element is suitably changed based on an operating state of the vehicle defined by the vehicle speed related value and the accelerator opening related value.

By using a control map in which a plurality of operating ranges of the vehicle for changing the engagement state of the engageable element according to the vehicle speed related value and the accelerator opening related value are defined, the engagement state change controlling module may execute the engagement state change control based on a currently applied operating range that is one of the plurality of operating ranges. The engagement state change restricting module may restrict the execution of the engagement state change control by enlarging the currently applied operating range on the control map.

According to this configuration, by changing the control map for the engagement state change control when the vehicle attitude control is executed, the frequency of executing the engagement state change control during the vehicle attitude control is lowered. Thus, the engagement state change control during the vehicle attitude control is suitably restricted, which results in securing the torque reduction for controlling the vehicle attitude.

According to one aspect of the present disclosure, a vehicle control device is provided, that includes a drive source for generating torque as a driving force that causes a vehicle to travel, a drive source control mechanism for controlling the torque generation by the drive source, a driving force transmission mechanism for transmitting the generated torque to vehicle wheels, an engageable element provided in the driving force transmission mechanism, an engagement state change controlling module for executing an engagement state change control in which an engagement state of the engageable element is changed, and a processor configured to execute a vehicle attitude controlling module for controlling an attitude of the vehicle by driving the drive source control mechanism to reduce the generated torque so as to decelerate the vehicle, when a condition is satisfied, the condition being that the vehicle is traveling and a steering angle related value that is related to a steering angle of a steering device increases, and a vehicle attitude control restricting module for restricting the execution of the vehicle attitude control while the engagement state change control is executed.

According to this configuration, the vehicle attitude control during the engagement state change control is suitably restricted. Thus, while the engagement state of the engageable element is changed, this change is reliably prevented from delaying or becoming unstable due to the torque reduction executed for controlling the vehicle attitude.

The vehicle attitude control restricting module may restrict the execution of the vehicle attitude control when at least one of a changing speed of the engagement state in the engagement state change control, a change amount of the engagement state in the engagement state change control, and a difference between a target value and an actual value of the engagement state by the engagement state change control, is above a given value.

According to this configuration, the execution of the vehicle attitude control is permitted when the change of the engagement state of the engageable element in the engagement state change control is small. Thus, also during the engagement state change control, the improvement in the steering stability, etc. by the vehicle attitude control is suitably secured.

According to one aspect of the present disclosure, a vehicle control device is provided, that includes a drive source for generating torque as a driving force that causes a vehicle to travel, a drive source control mechanism for controlling the torque generation by the drive source, a driving force transmission mechanism for transmitting the generated torque to vehicle wheels, an engageable element provided in the driving force transmission mechanism, an engagement state change controlling module for executing an engagement state change control in which an engagement state of the engageable element is changed, and a processor configured to execute a vehicle attitude controlling module for controlling attitude of the vehicle by driving the drive source control mechanism to reduce the generated torque so as to decelerate the vehicle, when a condition is satisfied, the condition being that the vehicle is traveling and a steering angle related value that is related to a steering angle of a steering device increases, and a period overlap preventing module for preventing an overlap between an execution period of the vehicle attitude control and an execution period of the engagement state change control.

According to this configuration, the overlap of the execution period of the engagement state change control with the execution period of the vehicle attitude control is suitably prevented. Therefore, it is prevented that the suitable torque reduction for controlling the vehicle attitude cannot be performed due the intervention of the engagement state change control during the vehicle attitude control. Thus, the vehicle attitude is controlled with high responsiveness to the steering operation by the driver and a vehicle behavior intended by the driver is accurately achieved. Additionally, according to this configuration, the overlap of the execution period of the vehicle attitude control with the execution period of the engagement state change control is prevented so that the change in the engagement state is reliably prevented from delaying or becoming unstable due to the intervention of the vehicle attitude control executed during the engagement state change control.

The vehicle may include a steering angle sensor for detecting the steering angle of the steering device. The vehicle attitude controlling module may execute the vehicle attitude control when the vehicle is traveling and a changing speed of the detected steering angle is above a given value.

DETAILED DESCRIPTION OF EMBODIMENTS

Hereinafter, a vehicle control device according to some embodiments of the present disclosure are described with reference to the accompanying drawings.
<System Configuration>

Figure 1:
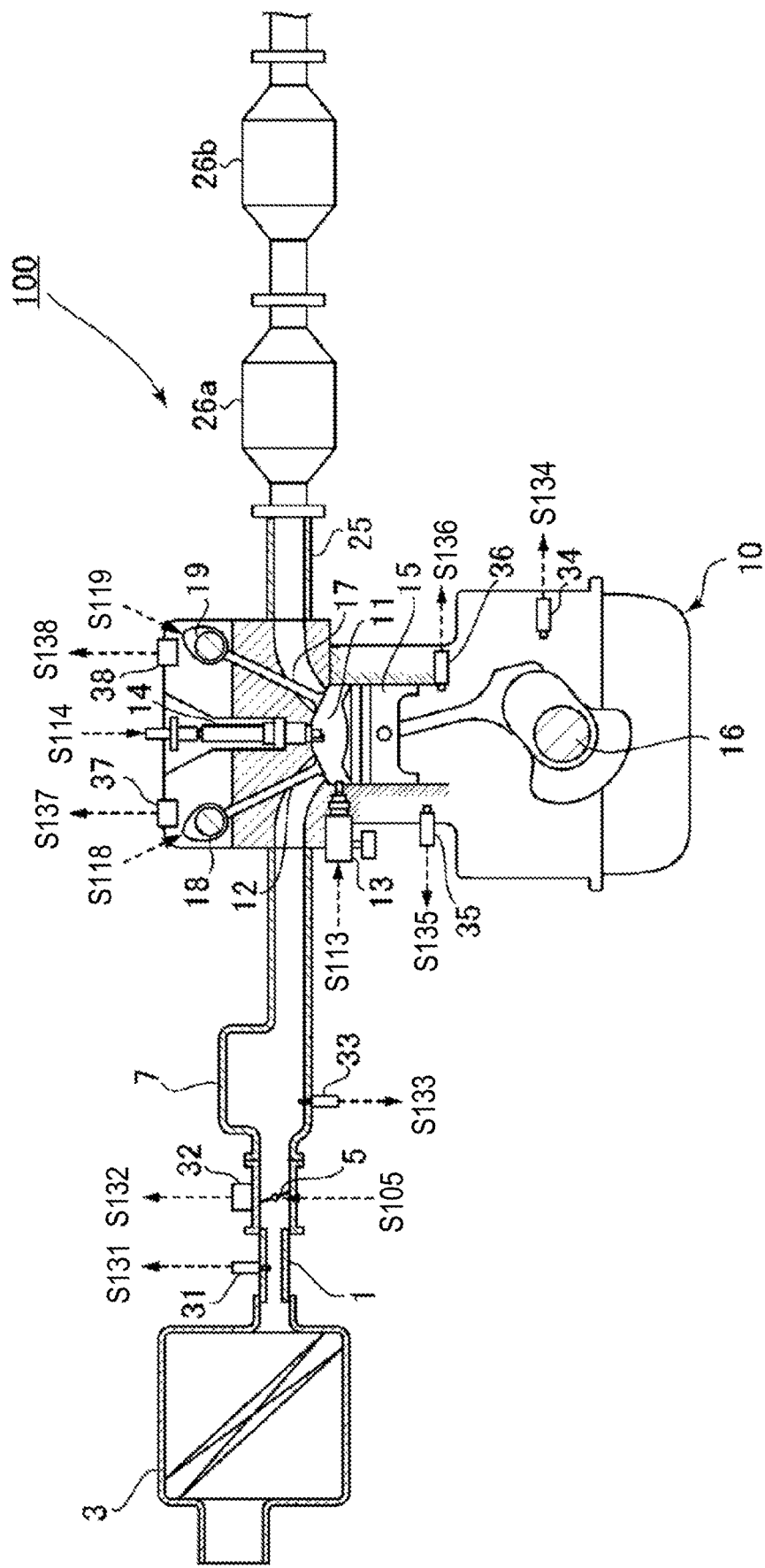
FIG. 1 is an outline configuration diagram of an engine system to which a vehicle control device according to one embodiment of the present disclosure is applied.

First, an engine system to which the vehicle control device according to one embodiment is applied is described with reference to FIGS. 1 and 2. FIG. 1 is an outline configuration diagram of the engine system, and FIG. 2 is a block diagram illustrating an electric configuration of the vehicle control device.

Figure 2:
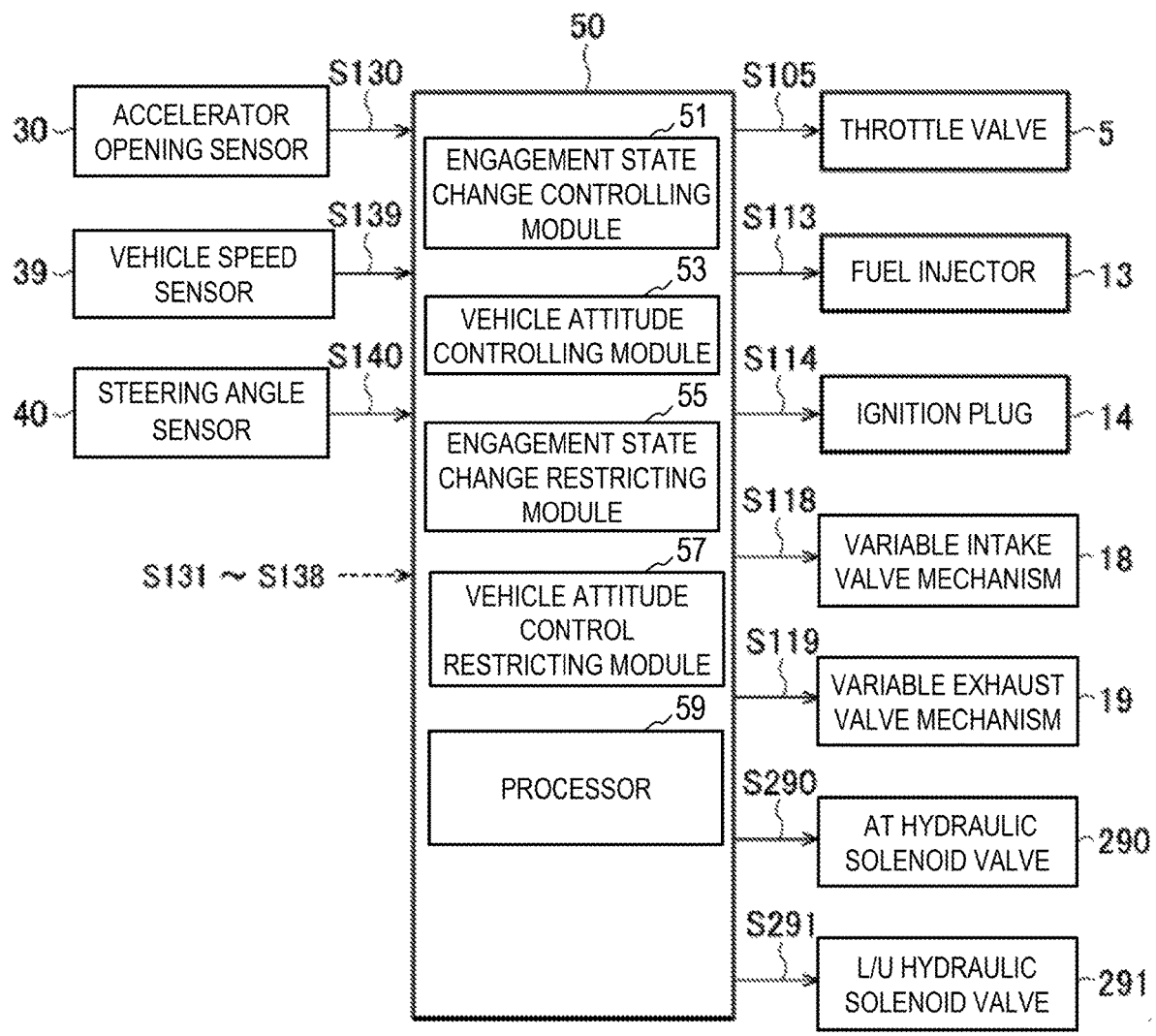
FIG. 2 is a block diagram illustrating an electric configuration of the vehicle control device according to the embodiment of the present disclosure.

As illustrated in FIGS. 1 and 2, the engine system 100 mainly has an intake passage 1 through which intake air (air) externally introduced passes, an engine 10 as a drive source (particularly, a gasoline engine) for generating a driving force for a vehicle on which the engine 10 is mounted by combusting mixture gas of the intake air supplied from the intake passage 1 and fuel supplied from a fuel injector 13 (described later), an exhaust passage 25 through which exhaust gas generated by the combustion inside the engine 10 is discharged, sensors 30 to 40 for detecting various kinds of states regarding the engine system 100, and a controller 50 for controlling the entire engine system 100.

In the intake passage 1, an air cleaner 3 for purifying the externally introduced intake air, a throttle valve 5 for adjusting an amount of passing intake air (intake air amount), and a surge tank 7 for temporarily storing intake air to be supplied to the engine 10 are arranged in this order from upstream side.

The engine 10 mainly has an intake valve 12 for introducing the intake air supplied from the intake passage 1 into a combustion chamber 11, the fuel injector 13 for injecting the fuel into the combustion chamber 11, an ignition plug 14 for igniting the mixture gas of the intake air and the fuel supplied into the combustion chamber 11, a piston 15 for reciprocating by combustion of the mixture gas inside the combustion chamber 11, a crankshaft 16 for rotating by the reciprocation motion of the piston 15, and an exhaust valve 17 for discharging the exhaust gas generated by the combustion of the mixture gas inside the combustion chamber 11 to the exhaust passage 25.

Moreover, the engine 10 is capable of varying operation timings of the intake valve 12 and the exhaust valve 17 (corresponding to valve phases) by a variable intake valve mechanism 18 and a variable exhaust valve mechanism 19 as a variable valve timing mechanism, respectively. The variable intake valve mechanism 18 and the variable exhaust valve mechanism 19 may adopt various types of known mechanisms. For example, the operation timings of the intake and exhaust valves 12 and 17 may be varied using electromagnetic or hydraulic mechanisms.

In the exhaust passage 25, exhaust purification catalysts 26a and 26b having an exhaust gas purifying function (such as $NO_x$ catalyst, three-way catalyst, or oxidation catalyst) are mainly arranged.

The engine system 100 is provided with the sensors 30 to 40 for detecting the various kinds of states regarding the engine system 100. That is, the accelerator opening sensor 30 detects an accelerator opening which is an opening of an accelerator pedal (corresponding to a depression amount of the accelerator pedal by a vehicle driver). The airflow sensor 31 (outputting output detection signal S131) detects the intake air amount corresponding to a flow rate of the intake air which passes through the intake passage 1. The throttle opening sensor 32 (outputting output detection signal S132) detects a throttle opening which is an opening of the throttle valve 5. The pressure sensor 33 (outputting output detection signal S133) detects a pressure inside an intake manifold corresponding to the intake air pressure which is applied to the engine 10. The crank angle sensor 34 (outputting output detection signal S134) detects a crank angle of the crankshaft 16. The water temperature sensor 35 (outputting output detection signal S135) detects a temperature of coolant which cools the engine 10. The temperature sensor 36 (outputting output detection signal S136) detects a temperature inside a cylinder of the engine 10. The cam angle sensors 37 and 38 (outputting output detection signals S137 and S138 respectively) detect operation timings (including close timing) of the intake and exhaust valves 12 and 17, respectively. The vehicle speed sensor 39 (outputting output detection signal S139) detects a speed of the vehicle (vehicle speed). The steering angle sensor 40 (outputting output detection signal S140) detects a rotational angle (steering angle) of a steering wheel provided to a steering device (not illustrated). These various sensors 30 to 40 output detection signals S130 to S140 corresponding to the detected parameters to the controller 50.

The controller 50 includes a PCM (Power-train Control Module) and a TCM (Transmission Control Module) which are not illustrated. The controller 50 controls various components of the engine system 100 based on the detection signals S130 to S140 received from the various sensors 30 to 40 described above. For example, the controller 50 supplies a control signal S105 to the throttle valve 5 to control the open and close timings and opening of the throttle valve 5, the controller 50 supplies a control signal S113 to the fuel injector 13 to control a fuel injection amount and a fuel injection timing, the controller 50 supplies a control signal S114 to the ignition plug 14 to control an ignition timing, and the controller 50 supplies control signals S118 and S119 to the variable intake valve mechanism 18 and the variable exhaust valve mechanism 19 to control the operation timings of the intake and exhaust valves 12 and 17. Note that each of the throttle valve 5, the fuel injector 13, the ignition plug 14, the variable intake valve mechanism 18, and the variable exhaust valve mechanism 19 corresponds to one example of "drive source control mechanism."

Further, the controller 50 controls an automatic transmission mounted on the vehicle. Here, the automatic transmission of this embodiment is described with reference to FIG. 3 and a control map of a lockup clutch of the automatic transmission of this embodiment is described with reference to FIG. 4.

Figure 3:
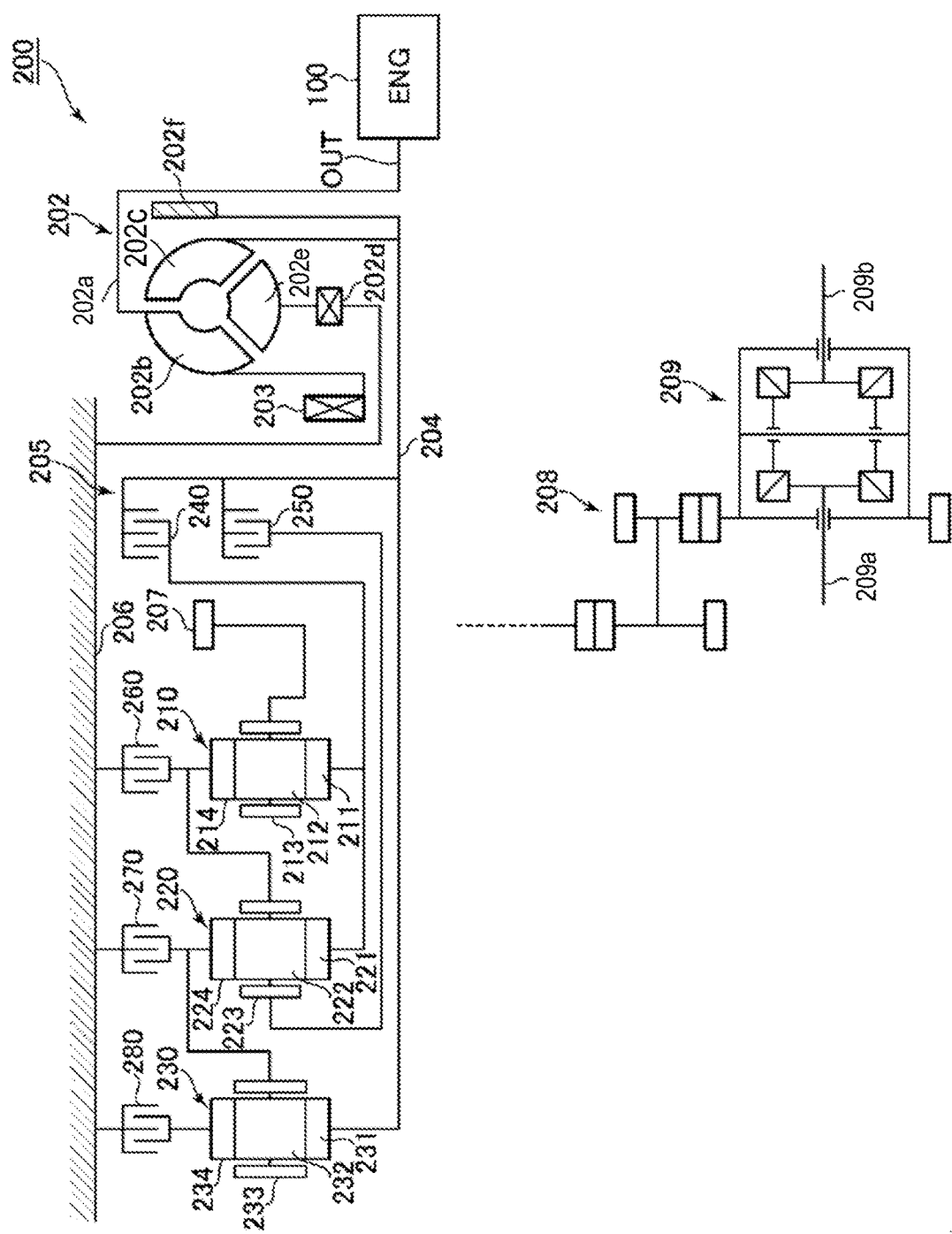
FIG. 3 is an outline configuration diagram of an automatic transmission according to the embodiment of the present disclosure.

FIG. 3 is an outline configuration diagram of the automatic transmission 200 according to this embodiment of the present disclosure. The automatic transmission 200 includes, as main components, a torque converter 202 attached to an engine output shaft OUT of the engine system 100, an oil pump 203 which is driven by the engine output shaft OUT via the torque converter 202, and a transmission mechanism 205 which receives an output rotation of the torque converter 202 via an input shaft 204. The automatic transmission 200 is accommodated inside a transmission case 206 while the oil pump 203 and the transmission mechanism 205 are disposed on the axis of the input shaft 204.

Further, the output rotation of the transmission mechanism 205 is transmitted from an output gear 207 also disposed on the axis of the input shaft 204, to a differential device 209 via a counter drive mechanism 208 so as to drive left and right axles 209a and 209b. Vehicle wheels (not illustrated) are connected to these axles 209a and 209b.

The torque converter 202 includes a case 202a connected to the engine output shaft OUT, a pump 202b fixed in the case 202a, a turbine 202c which is disposed on an opposite side from the pump 202b and driven by the pump 202b via hydraulic fluid, a stator 202e which is interposed between the pump 202b and the turbine 202c and supported by the transmission case 206 via a one-way clutch 202d to perform a torque increase action, and a lockup clutch 202f disposed between the case 202a and the turbine 202c and directly connecting the engine output shaft OUT and the turbine 202c via the case 202a. Further, the rotation of the turbine 202c is inputted to the transmission mechanism 205 via the input shaft 204.

Here, the lockup clutch 202f is controlled by the controller 50 via an L/U hydraulic solenoid valve 291 (see FIG. 2) by control signal S291 so that an engagement state of the lockup clutch 202f is changeable. Note that the lockup clutch 202f corresponds to one example of "engageable element."

On the other hand, the transmission mechanism 205 has first, second, and third planetary gear sets (hereinafter, referred to as "first, second, and third gear sets") 210, 220, and 230 which are disposed in the transmission case 206 on an opposite side from the torque converter with respect to the output gear 207 and are arranged in this order from the torque converter side.

Friction elements constituting the transmission mechanism 205 includes a first clutch 240 and a second clutch 250 which are disposed on the torque converter side of the output gear 207, and a first brake 260, a second brake 270, and a third brake 280 which are disposed on the opposite side from the torque converter with respect to the output gear 207, in this order from the torque converter side.

Each of the first, second, and third gear sets 210, 220, and 230 is a single pinion type planetary gear set. The first, second, and third gear sets 210, 220, and 230 include sun gears 211, 221, and 231, a plurality of pinions 212, 222, and 232 meshing with the sun gears 211, 221, and 231, carriers 213, 223, and 233 supporting the pinions 212, 222, and 232, and ring gears 214, 224, and 234 meshing with the pinions 212, 222, and 232, respectively.

The input shaft 204 is connected to the sun gear 231 of the third gear set 230. The sun gear 211 of the first gear set 210 is connected to the sun gear 221 of the second gear set 220. The ring gear 214 of the first gear set 210 is connected to the carrier 223 of the second gear set 220. The ring gear 224 of the second gear set 220 is connected to the carrier 233 of the third gear set 230. The output gear 207 is connected to the carrier 213 of the first gear set 210.

Further, the sun gear 211 of the first gear set 210 and the sun gear 221 of the second gear set 220 are disconnectably connected to the input shaft 204 via the first clutch 240. The carrier 223 of the second gear set 220 is disconnectably connected to the input shaft 204 via the second clutch 250.

Furthermore, the ring gear 214 of the first gear set 210 and the carrier 223 of the second gear set 220 are disconnectably connected to the transmission case 206 via the first brake 260. The ring gear 224 of the second gear set 220 and the carrier 233 of the third gear set 230 are disconnectably connected to the transmission case 206 via the second brake 270. The ring gear 234 of the third gear set 230 is disconnectably connected to the transmission case 206 via the third brake 280.

In the transmission mechanism 205 described above, ranges of P (parking), R (reverse), N (neutral), and D (forward), and gear positions (1st to 6th gears) in D range are achieved by combination of the engagement states of the first and second clutches 240 and 250 and the first, second, and third brakes 260, 270, and 280. In this case, the engagement states of the first and second clutches 240 and 250 and the first, second, and third brakes 260, 270, and 280 are controlled by the controller 50 via an AT hydraulic solenoid valve 290 (see FIG. 2) by control signal S290. Strictly speaking, the AT hydraulic solenoid valve 290 includes a plurality of hydraulic solenoid valves for controlling the first and second clutches 240 and 250 and the first, second, and third brakes 260, 270, and 280 individually.

Figure 4:
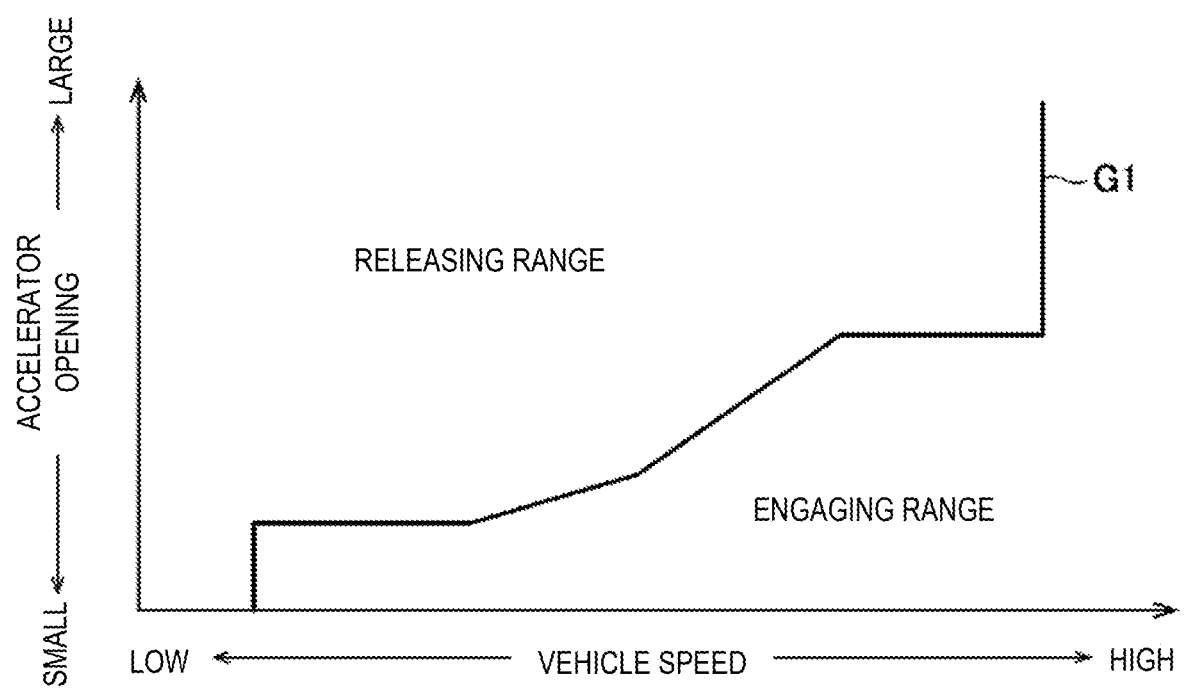
FIG. 4 is a lockup control map according to the embodiment of the present disclosure.

Next, FIG. 4 illustrates a lockup control map for changing the engagement state of the lockup clutch 202f according to this embodiment of the present disclosure. In FIG. 4, the horizontal axis indicates the vehicle speed and the vertical axis indicates the accelerator opening. As illustrated in FIG. 4, in this control map, an operating range of the vehicle defined by the vehicle speed and the accelerator opening is divided into two ranges by a graph G1 indicated by a solid line. One of the two ranges is a releasing range in which the lockup clutch 202f is set to be in a released state, and the other range is an engaging range in which the lockup clutch 202*f* is set to be in an engaged state. Here, "released state" means a fully released state of the lockup clutch 202*f*, while the meaning of "engaged state" includes a fully engaged state and a slip state of the lockup clutch 202*f*. The slip state of the lockup clutch 202*f* corresponds to a state where the output of the engine output shaft OUT (corresponding to the engine speed) and the output of the turbine 202*c* are different therebetween. The engagement state of the lockup clutch 202*f* corresponds to one of the released state and the engaged state described above, and is typically expressed by an engagement ratio or a slip ratio.

The controller 50 executes a control of changing the engagement state of the lockup clutch 202*f* via the L/U hydraulic solenoid valve 291 (see FIG. 2) based on changes in the vehicle speed and the accelerator opening by referring to the lockup control map as illustrated in FIG. 4. This control corresponds to one example of "engagement state change control" and may be referred to as "lockup control" in the following description. For example, as the lockup control, the controller 50 changes the state of the lockup clutch 202*f* from the released state to the engaged state (the fully engaged state or the slip state) or from the engaged state to the released state.

Returning to FIG. 2, the controller 50 has the following functional components. The controller 50 includes an engagement state change controlling module 51 for executing the lockup control based on the changes in the vehicle speed and the accelerator opening. For example, the engagement state change controlling module 51 controls a voltage or current applied to the L/U hydraulic solenoid valve 291 (both correspond to "hydraulic pressure command value"). The controller 50 also includes a vehicle attitude controlling module 53 for executing a vehicle attitude control in which attitude of the vehicle is controlled by reducing a torque of the engine 10 to decelerate the vehicle (hereinafter, this control is suitably referred to as "torque reduction control"), when a condition that the vehicle is traveling and a steering angle related value which is related to the steering angle of the steering wheel (typically, a steering speed) increases is satisfied. The controller 50 also includes an engagement state change restricting module 55 for restricting the execution of the lockup control while the torque reduction control is executed, and a vehicle attitude control restricting module 57 for restricting the execution of the torque reduction control while the lockup control is executed. The engagement state change restricting module 55 and the vehicle attitude control restricting module 57 prevent overlap between an execution period of the torque reduction control and an execution period of the lockup control, and function as "period overlap preventing module."

The respective components of the controller 50 are configured by a computer including a processor 59 (e.g. a CPU (central processing unit)) and internal memories, such as ROM(s) and RAM(s) for storing various programs which are interpreted and executed by the processor 59 (the programs include a basic control program (e.g., an OS) and an application program activated on the OS and for achieving a particular function), and various data. The processor 59 is configured to execute the engagement state change controlling module 51, vehicle attitude controlling module 53, engagement state change restricting module 55, and vehicle attitude control restricting module 57 to perform their respective functions. These modules are stored in the internal memory as one or more software programs.

Control in First Embodiment

Next, a control executed by the vehicle control device in a first embodiment of the present disclosure is described with reference to FIGS. 5 to 7.

Figure 5:
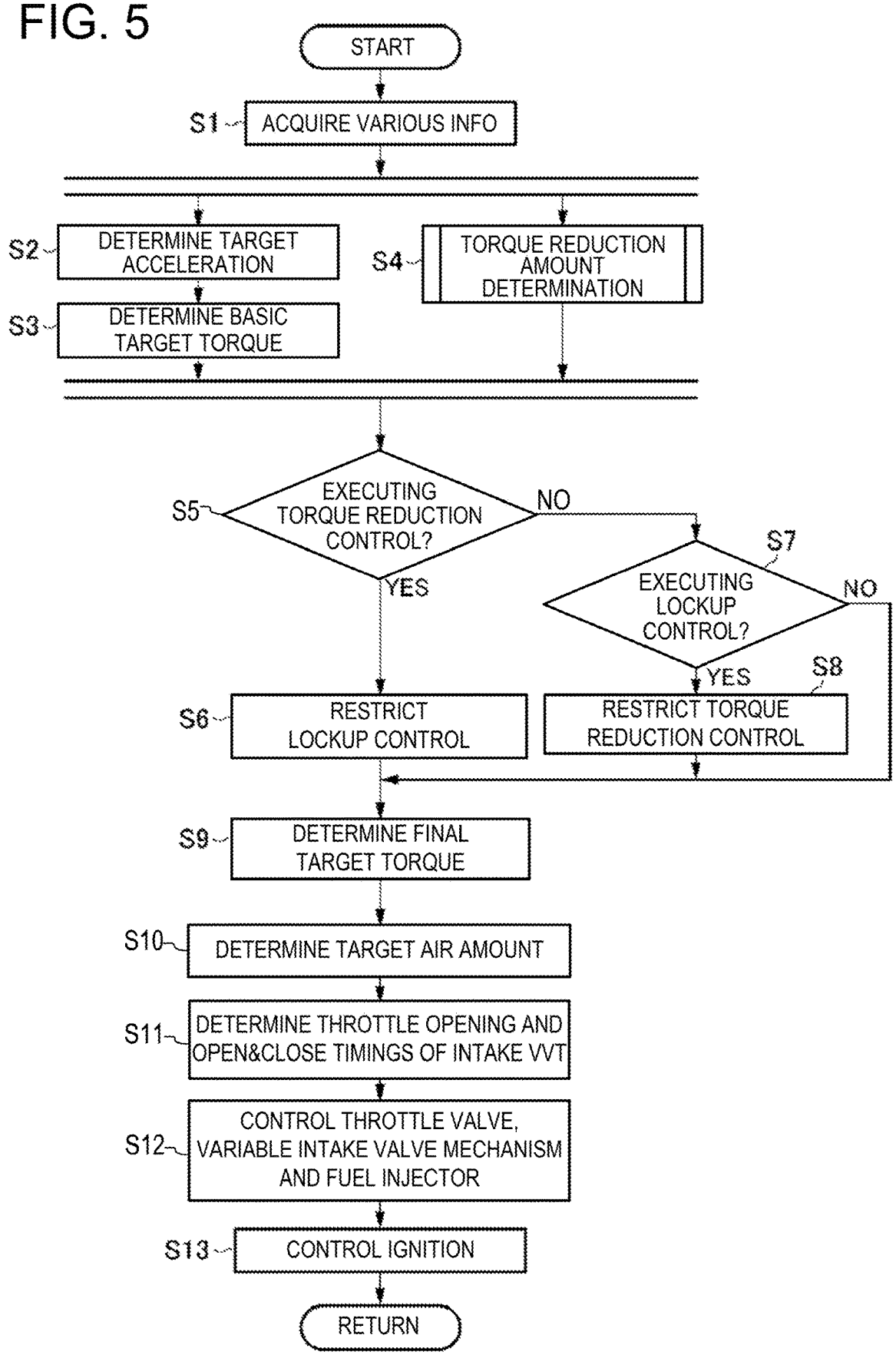
FIG. 5 is a flowchart illustrating a control executed by the vehicle control device according to a first embodiment of the present disclosure.

FIG. 5 is a flowchart illustrating an engine control executed by the vehicle control device according to the first embodiment of the present disclosure. FIG. 6 is a flowchart of a torque reduction amount determination by the vehicle control device according to the first embodiment of the present disclosure. FIG. 7 is a map illustrating a target additional deceleration determined by the vehicle control device and the steering speed according to the first embodiment of the present disclosure.

The engine control of FIG. 5 is activated when an ignition switch of the vehicle is turned ON, and power is supplied to the controller 50. The engine control is basically executed while the vehicle is traveling.

When the engine control is started, as illustrated in FIG. 5, the controller 50 acquires an operating state of the vehicle at S1. For example, the controller 50 acquires, as the operating state, the detection signals S130 to S140 outputted from the various sensors 30 to 40, including the accelerator opening detected by the accelerator opening sensor 30, the vehicle speed detected by the vehicle speed sensor 39, the steering angle detected by the steering angle sensor 40, and a gear position currently set at the automatic transmission of the vehicle.

Next, at S2, the controller 50 sets a target acceleration based on the operating state of the vehicle including the accelerator pedal operation acquired at S1. For example, the controller 50 selects an acceleration characteristic map corresponding to the current vehicle speed and gear position from acceleration characteristic maps defined for various vehicle speeds and gear positions (they are created in advance and stored in a memory, etc.). The controller 50 determines the target acceleration corresponding to the current accelerator opening by referring to the selected acceleration characteristic map.

Next, at S3, the controller 50 determines a basic target torque of the engine 10 for achieving the target acceleration determined at S2. In this case, the controller 50 determines the basic target torque within a torque range which is outputtable by the engine 10, based on the vehicle speed, the gear position, the engagement state of the lockup clutch 202*f*, a road surface slope, a road surface μ, etc. at this time point.

In parallel to the processings at S2 and S3, the controller 50 performs the torque reduction amount determination at S4 for determining the torque reduction amount in the torque reduction control described above (vehicle attitude control) based on the steering angle of the steering wheel detected by the steering angle sensor 40. This torque reduction amount determination is described with reference to FIG. 6.

Figure 6:
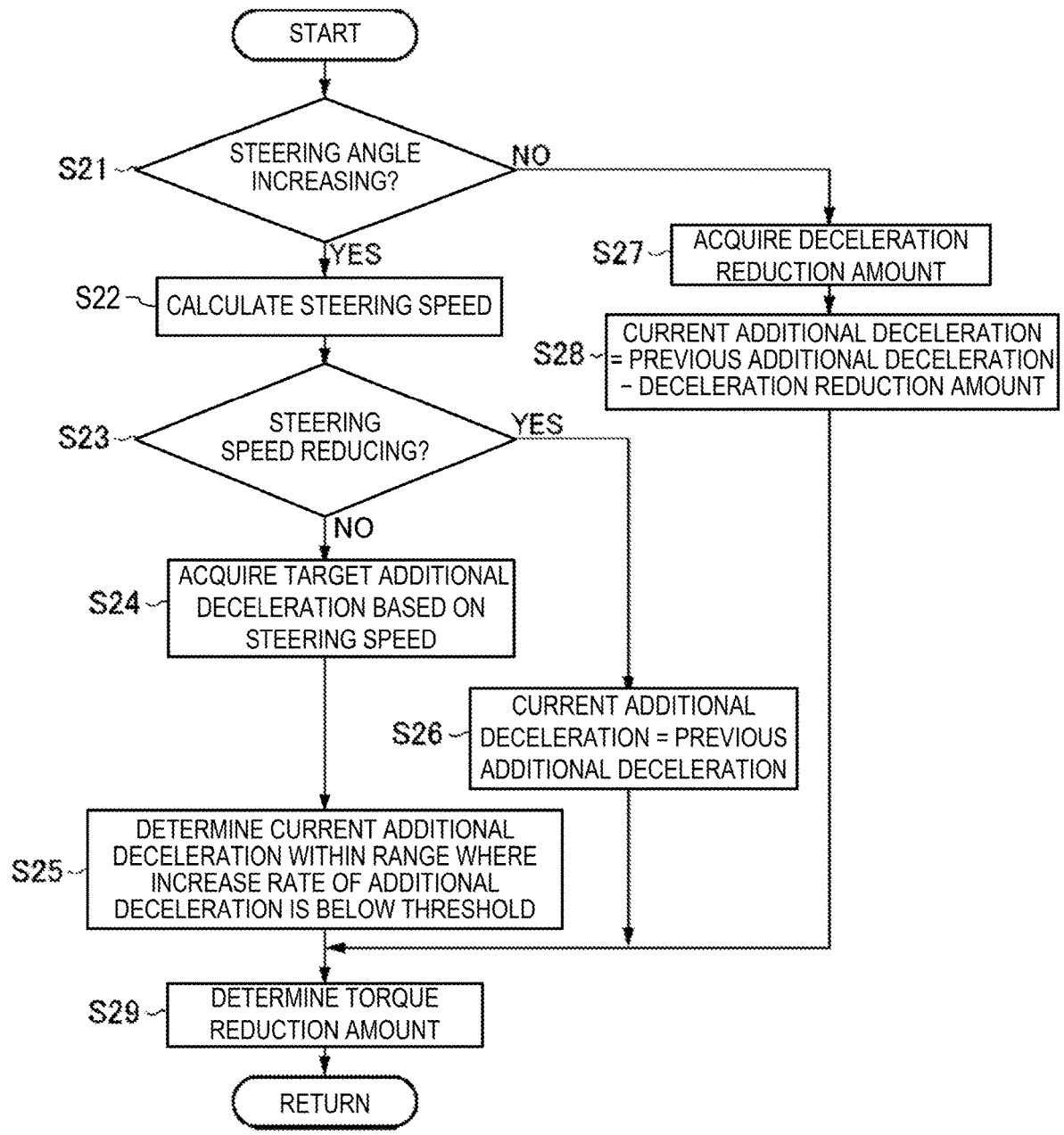
FIG. 6 is a flowchart illustrating a torque reduction amount determination according to the first embodiment of the present disclosure.

As illustrated in FIG. 6, when the torque reduction amount determination is started, at S21, the controller 50 determines whether an absolute value of the steering angle acquired at S1 is increasing. If the absolute value of the steering angle is increasing (S21: YES), the process proceeds to S22 where the controller 50 calculates the steering speed based on the steering angle acquired at S1.

Next, at S23, the controller 50 determines whether the absolute value of the steering speed is being reduced. If the absolute value of the steering speed is not being reduced (S23: NO), that is, if the absolute value of the steering speed is increasing or constant, the process proceeds to S24 where the controller 50 acquires the target additional deceleration based on the steering speed. This target additional deceleration is a deceleration to be added to the vehicle according to the steering operation in order to accurately achieve the vehicle behavior intended by the driver.

Figure 7:
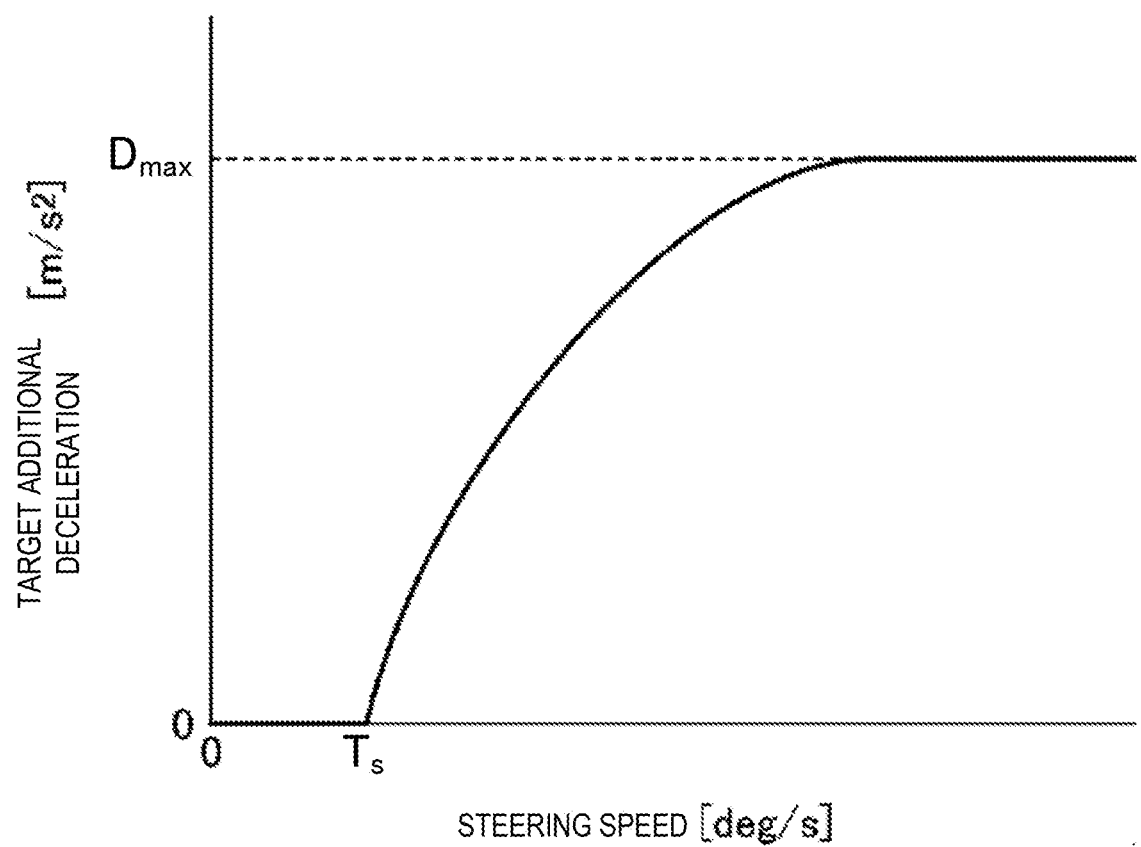
FIG. 7 is a map for determining a target additional deceleration according to the first embodiment of the present disclosure.

For example, the controller 50 acquires the target additional deceleration corresponding to the steering speed calculated at S22 based on the relationship between the target additional deceleration and the steering speed illustrated in the map of FIG. 7.

In FIG. 7, the horizontal axis indicates the steering speed and the vertical axis indicates the target additional deceleration. As illustrated in FIG. 7, when the steering speed is below a threshold $T_s$ (e.g., 10 deg/s), the corresponding target additional deceleration is 0. In other words, when the steering speed is below the threshold $T_s$, the deceleration addition to the vehicle according to the steering operation is not performed.

On the other hand, when the steering speed is above the threshold $T_s$, the target additional deceleration corresponding to this steering speed gradually approaches a given upper limit value $D_{max}$ (e.g., 1 m/s$^2$) as the steering speed increases. Thus, as the steering speed increases, the target additional deceleration increases while the increase rate thereof becomes lower.

Next, at S25, the controller 50 determines the additional deceleration for the current processing within a range where an increase rate of the additional deceleration is below a threshold $R_{max}$ (e.g., 0.5 m/s$^3$).

For example, when the increase rate from the additional deceleration determined in the previous processing to the target additional deceleration determined at S24 in the current processing is below $R_{max}$, the controller 50 determines the target additional deceleration determined at S24 as the additional deceleration for the current processing.

On the other hand, if the change rate from the additional deceleration determined in the previous processing to the target additional deceleration determined at S24 in the current processing is larger than $R_{max}$, the controller 50 determines, as the additional deceleration for the current processing, a value obtained by increasing the additional deceleration from the value determined in the previous processing to the current processing at the increase rate $R_{max}$.

At S23, if the absolute value of the steering speed is being reduced (S23: YES), the process proceeds to S26 where the controller 50 determines the additional deceleration determined in the previous processing as the additional deceleration for the current processing. That is, when the absolute value of the steering speed is being reduced, the additional deceleration at the maximum (i.e., a highest value of the additional deceleration) is maintained.

On the other hand, at S21, if the absolute value of the steering angle is not increasing (S21: NO), that is, if the steering angle is constant or being reduced, the process proceeds to S27 where the controller 50 acquires a reduction amount in the current processing, of the additional deceleration determined in the previous processing (deceleration reduction amount). This deceleration reduction amount is calculated, for example, based on a constant reduction rate (e.g., 0.3 m/s$^3$) stored in advance in the memory, etc. Alternatively, the deceleration reduction amount is calculated based on a reduction rate determined according to the operating state of the vehicle acquired at S1 and/or the steering speed calculated at S22.

At S28, the controller 50 determines the additional deceleration for the current processing by subtracting the deceleration reduction amount acquired at S27 from the additional deceleration determined in the previous processing.

After S25, S26, or S28, at S29, the controller 50 determines the torque reduction amount based on the current additional deceleration determined at S25, S26, or S28. For example, the controller 50 determines the torque reduction amount required for achieving the current additional deceleration, based on the current vehicle speed, gear position, engagement state of the lockup clutch 202f, road surface slope, etc. acquired at S1. In this case, basically during the torque reduction control, the controller 50 determines the torque reduction amount based on the engagement state of the lockup clutch 202f at the start of the torque reduction control (i.e., at the time that an execution condition of the torque reduction control is satisfied). After S29, the controller 50 terminates the torque reduction amount determination and returns to the main routine.

Note that at S21, instead of determining whether the steering angle (absolute value) is increasing, whether the steering speed (that is, the change speed of the steering angle) is above a given value may be determined. For example, the execution condition of the torque reduction control may be considered to be satisfied when the steering speed exceeds a first value, and the torque reduction amount may be determined at S23 to S26 and S29 sequentially. Then, when the steering speed falls below a second value, a termination condition of the torque reduction control may be considered to be satisfied and the torque reduction amount may be determined at S27 to S29 sequentially. In addition, these first and second values may adopt values according to the steering speed threshold $T_s$ illustrated in FIG. 7.

Returning to FIG. 5, after the processings at S2 and S3 and the torque reduction amount determination at S4, the controller 50 determines whether the torque reduction control is currently executed at S5. If the torque reduction control is currently executed (S5: YES), the process proceeds to S6 where the controller 50 restricts the execution of the lockup control (engagement state change control) in which the engagement state of the lockup clutch 202f is changed. In this case, the controller 50 keeps the current state of power distribution of the L/U hydraulic solenoid valve 291 that adjusts the engagement state of the lockup clutch 202f, for example. In other words, the one of voltage and current applied to the L/U hydraulic solenoid valve 291 is kept unchanged. In this manner, the controller 50 prevents that the execution period of the torque reduction control with the execution period of the lockup control overlap with each other. Then, the process proceeds to S9 where the controller 50 determines a final target torque by subtracting the torque reduction amount determined in the torque reduction amount determination at S4 from the basic target torque determined at S3.

On the other hand, if the torque reduction control is currently not executed (S5: NO), the process proceeds to S7 where the controller 50 determines whether the lockup control is currently executed. In other words, the controller 50 determines whether the lockup control in which the engagement state of the lockup clutch 202f is changed according to the change of the vehicle speed and/or the accelerator opening is currently executed. If the lockup control is currently executed (S7: YES), the process proceeds to S8 where the controller 50 restricts (in this embodiment, prohibits) the execution of the torque reduction control. In this manner, the controller 50 prevents that the execution period of the torque reduction control with the execution period of the lockup control overlap with each other. Then the process proceeds to S9 where the controller 50 basically determines the basic target torque determined at S3 as the final target torque.

If the lockup control is currently not executed (S7: NO), this means that neither the torque reduction nor the lockup control is executed, the controller 50 proceeds to S9 to determine the basic target torque determined at S3 as the final target torque as it is.

Then the process proceeds to S10 where the controller 50 determines a target air amount and a target fuel amount so that the engine 10 outputs the final target torque determined at S9. Here, "air amount" means an amount of air introduced into the combustion chamber 11 of the engine 10. Note that a charge efficiency which is the air amount expressed as a dimensionless number may be used.

For example, the controller 50 calculates a target indicated torque by taking into consideration a loss torque due to friction loss and pumping loss on top of the final target torque, and calculates the target fuel amount required to generate the target indicated torque. Then, the controller 50 determines the target air amount based on the target fuel amount and a target equivalent ratio.

Next, at S11, the controller 50 determines the opening of the throttle valve 5 and the open and close timings of the intake valve 12 via the variable intake valve mechanism 18 by taking into consideration the air amount detected by the airflow sensor 31, so that air of the target amount determined at S10 is introduced into the engine 10.

Next, at S12, the controller 50 controls the throttle valve 5 and the variable intake valve mechanism 18 based on the throttle opening and the open and close timings of the intake valve 12 set at S11, and controls the fuel injector 13 based on the target fuel amount calculated at S10.

Next, at S13, the controller 50 sets an ignition timing so that the engine 10 outputs the final target torque based on the final target torque determined at S9 and an actual air amount introduced into the combustion chamber 11 as a result of the control of the throttle valve 5 and the variable intake valve mechanism 18 at S11. The controller 50 controls the ignition plug 14 so that the ignition is performed at the ignition timing. After S13, the controller 50 terminates the engine control.

Next, the operations and effects of the vehicle control device according to the first embodiment of the present disclosure are described with reference to FIG. 8, which is a time chart illustrating a change of parameters related to the engine control over time in a case where the vehicle equipped with the vehicle control device of the first embodiment makes a turn by the steering wheel operation.

Figure 8:
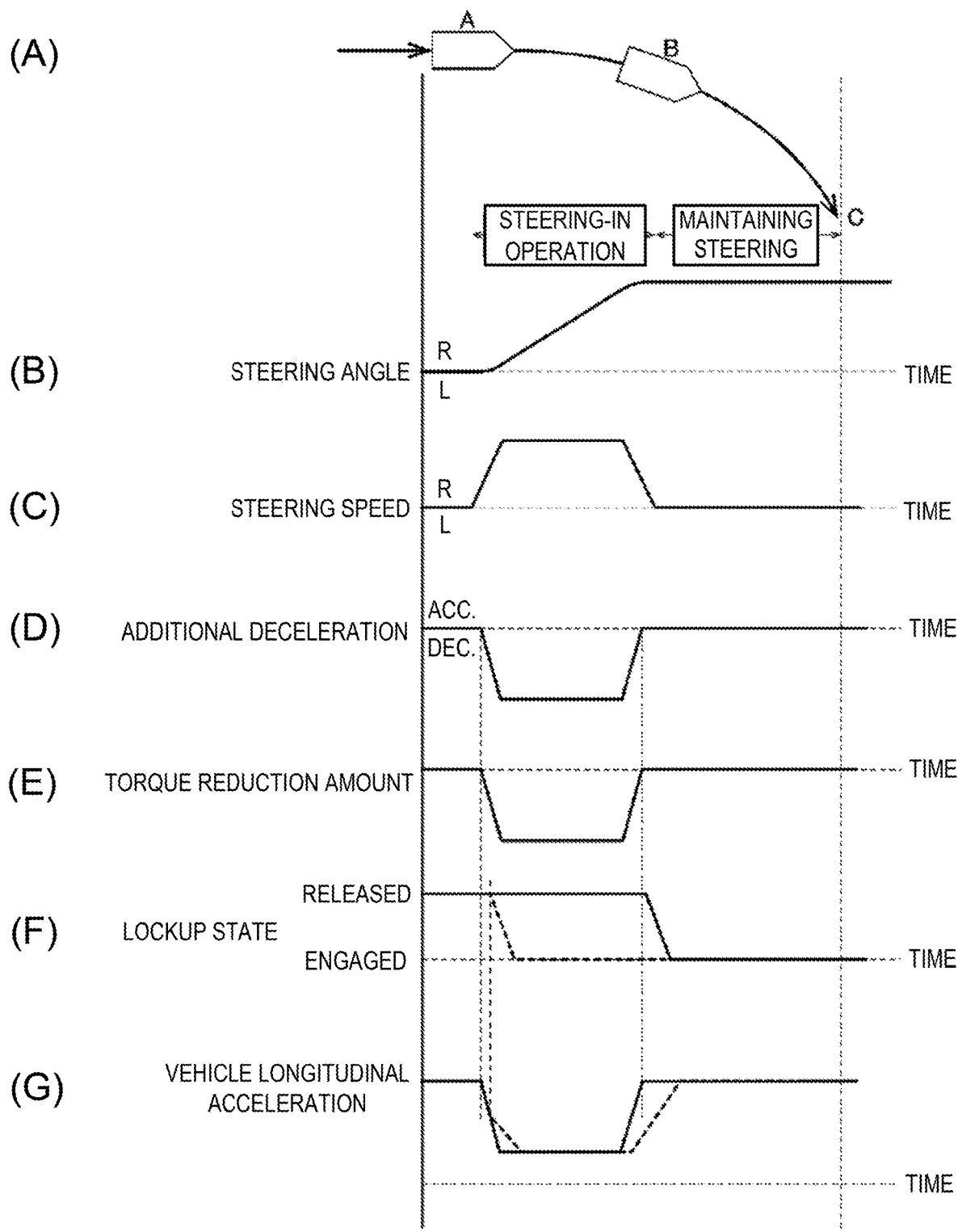
FIG. 8 is a time chart illustrating operations and effects of the vehicle control device according to the first embodiment of the present disclosure.

Part (A) of FIG. 8 is a plan view schematically illustrating the vehicle making a right turn. As illustrated in Part (A), the vehicle starts turning rightward from a position A and then continues the right turn at a fixed steering angle from a position B to a position C.

Part (B) of FIG. 8 is a graph illustrating a change in the steering angle of the vehicle which makes the turn to the right as illustrated in Part (A). In Part (B), the horizontal axis indicates time and the vertical axis indicates the steering angle.

As illustrated in Part (B), a rightward steering is started at the position A, a rightward steering angle increases gradually by performing an additional steering operation, and the rightward steering angle becomes the maximum at the position B. The steering angle is then kept constant to the position C (steering maintained).

Part (C) of FIG. 8 is a graph illustrating a change in the steering speed of the vehicle which makes the right turn as illustrated in Part (B). In Part (C), the horizontal axis indicates time and the vertical axis indicates the steering speed.

The steering speed of the vehicle is expressed by a derivative of the steering angle of the vehicle with respect to time. That is, as illustrated in Part (C), when the rightward steering is started at the position A, a rightward steering speed occurs, and the steering speed is kept almost constant between the position A and the position B. Then, the rightward steering speed is reduced, and the steering speed becomes 0 when the rightward steering angle reaches the maximum at the position B. Furthermore, the steering speed remains at 0 while the rightward steering angle is maintained from the position B to the position C.

Part (D) of FIG. 8 is a graph illustrating a change in the additional deceleration which is determined based on the steering speed illustrated in Part (C). In Part (D), the horizontal axis indicates time and the vertical axis indicates the additional deceleration.

As described with reference to FIG. 6, in the case where the absolute value of the steering angle is increasing and the absolute value of the steering speed is not being reduced (S21: YES and S23: NO in FIG. 6), the controller 50 acquires the target additional deceleration according to the steering speed (see FIG. 7) and, as illustrated in Part (D) of FIG. 8, determines the additional deceleration within a range where the increase rate of the additional deceleration is below the threshold $R_{max}$ (S25 of FIG. 6). In other words, the controller 50 increases the additional deceleration so that the increase rate $\leq R_{max}$. Then, when the absolute value of the steering angle increases and the absolute value of the steering speed is reduced (S21 and S23: YES in FIG. 6), the controller 50 keeps the additional deceleration applied when the steering speed is at the maximum, and when the absolute value of the steering angle is being reduced (S21: NO in FIG. 6), the deceleration reduction amount is acquired, and the additional deceleration is reduced by the deceleration reduction amount (S27 and S28 of FIG. 6).

Part (E) of FIG. 8 is a graph illustrating a change of the torque reduction amount determined based on the additional deceleration illustrated in Part (D). In Part (E), the horizontal axis indicates time and the vertical axis indicates the torque reduction amount.

As described above, the controller 50 determines the torque reduction amount required for achieving the additional deceleration, based on the parameters, such as the current vehicle speed, gear position, road surface slope, etc. Therefore, when these parameters are constant, the torque reduction amount is determined to change similarly to the additional deceleration illustrated in Part (D).

Note that the controller 50 determines the final target torque by subtracting the torque reduction amount determined in the torque reduction amount determination from the basic target torque (here, the basic target torque is substantially constant). Thus, the change of the torque reduction amount illustrated in Part (E) is reflected on the final target torque. Although the final target torque is not illustrated in FIG. 8, it changes similarly to the torque reduction amount in Part (E).

Part (F) of FIG. 8 is a graph illustrating a change of the lockup state (released state/engaged state) which corresponds to the engagement state of the lockup clutch 202*f*. In Part (F), the horizontal axis indicates time and the vertical axis indicates the lockup state. Further in Part (F), the solid line indicates the change in the first embodiment, and the dashed line indicates the change in a comparative example. Note that the lockup clutch 202*f* is set to the released state at the start of the torque reduction control.

Part (F) illustrates a case where a request is issued for switching the state of the lockup clutch 202*f* from the released state to the engaged state by changing the vehicle speed or the accelerator opening while the steering-in operation is performed between the position A and the position B and the torque reduction amount is set, specifically, immediately after the torque reduction control is started. In this case, in the comparative example, without considering the torque reduction control, the state of the lockup clutch 202f is quickly switched from the released state to the engaged state according to the request (see the dashed line of Part (F)). In other words, in the comparative example, the lockup control is executed to change the engagement state of the lockup clutch 202f while the torque reduction control is executed.

On the other hand, in the first embodiment, when the controller 50 determines that the request is issued during the torque reduction control (S5: YES in FIG. 5), it restricts the execution of the lockup control (S6 in FIG. 5). In other words, the controller 50 prevents the overlap of the execution period of the lockup control with the execution period of the torque reduction control. For example, the controller 50 maintains the released state of the lockup clutch 202f so that the state of the lockup clutch 202f is kept unchanged while the torque reduction control is executed (see the solid line of Part (F) of FIG. 8). After the torque reduction control, particularly, after the engine torque resumes back to the torque before the torque reduction control, the controller 50 quickly switches the state of the lockup clutch 202f from the released state to the engaged state.

Part (G) of FIG. 8 is a graph illustrating a change of a longitudinal acceleration of the vehicle, in which the horizontal axis indicates time and the vertical axis indicates the vehicle longitudinal acceleration. In Part (G), the solid line indicates the longitudinal acceleration in the first embodiment and the dashed line indicates the longitudinal acceleration of the comparative example.

In both the first embodiment and the comparative example, since the final target torque is reduced by the torque reduction control, the vehicle is decelerated after the torque reduction control is started. Here, in the comparative example, since the lockup clutch 202f is switched from the released state to the engaged state immediately after the start of the torque reduction control (see the dashed line of Part (F)), the torque applied to the vehicle wheels via the automatic transmission 200 that includes the lockup clutch 202f does not decrease suitably according to the engine torque reduced in the torque reduction control. Therefore, the deceleration of the vehicle reduces, more specifically, the vehicle is decelerated comparatively gradually (see the dashed line of Part (G)). As a result, it may be said that the desired vehicle attitude cannot suitably be achieved by the torque reduction control.

In this regard, in the first embodiment, since the controller 50 maintains the lockup clutch 202f in the released state while the torque reduction control is executed (see the solid line of Part (F) of FIG. 8), the torque applied to the vehicle wheels via the automatic transmission 200 which includes the lockup clutch 202f suitably decreases according to the engine torque. Thus, as indicated by the solid line of Part (G) of FIG. 8, the vehicle is suitably decelerated (specifically, the vehicle is smoothly decelerated) and the load shifting to the front wheels occurs, which increases a frictional force between the front wheels and the road surface and also increases a cornering force of the front wheels. As a result, turnability of the vehicle improves, in other words, the yaw rate which occurs to the vehicle (here, a yaw rate in the clockwise direction) becomes relatively high. Therefore, according to this embodiment, the vehicle attitude is controlled with high responsiveness to the steering operation by the driver, and the behavior intended by the driver is accurately achieved. That is, steering stability is suitably improved.

Then, as indicated by Part (E) of FIG. 8, the torque reduction amount is lowered slightly before the position B and the engine torque resumes back to the torque before the torque reduction control was applied. Here, although the control mode for resuming the torque is the same between the comparative example and the first embodiment (see Part (E)), in the comparative example, the lockup clutch 202f is set to the engaged state, thus the increase of the longitudinal acceleration is delayed, in other words, the increase of the longitudinal acceleration becomes gradual (see the dashed line in Part (G)) compared with the first embodiment in which the lockup clutch 202f is set to the released state. This is because the torque reduction amount applied in the torque reduction control is determined based on the engagement state of the lockup clutch 202f when the execution condition of the torque reduction control is satisfied (in this example, the released state). In other words, the torque reduction amount determined under the condition that the lockup clutch 202f is in the released state is not suitable for quickly resuming the torque when the lockup clutch 202f is set to the engaged state as in the comparative example.

As described with reference to FIG. 8, according to the first embodiment, since the execution of the lockup control (engagement state change control) is restricted during the torque reduction control (vehicle attitude control). Therefore, it is reliably prevented that the suitable torque reduction for controlling the vehicle attitude ("torque reduction" used here means a reduction in the torque applied to the vehicle wheels) cannot be performed due to the engagement state of the lockup clutch 202f changing while the torque is reduced as in the comparative example. Thus, according to the first embodiment, the vehicle attitude is controlled with high responsiveness to the steering operation by the driver, and the behavior intended by the driver is accurately achieved. That is, steering stability is suitably improved.

In addition, while the example is illustrated in FIG. 8 in which the lockup control is executed during the torque reduction control, according to the first embodiment, the execution of the torque reduction control is restricted during the lockup control. Thus, it is reliably prevented that while the engagement state of the lockup clutch 202f is changed, the change of the engagement state is delayed or becomes unstable due to the torque reduction for the vehicle attitude control. Therefore, it becomes possible to secure improvements in fuel consumption, and acceleration performance, vibration reduction, etc by the change of the engagement state of the lockup clutch 202f.

Control in Second Embodiment

Next, a control executed by the vehicle control device in a second embodiment of the present disclosure is described. Hereinafter, only the control different from the first embodiment is described and description of the similar/same control as in the first embodiment is omitted (same for the operations and effects). In other words, the contents not described here are same as/similar to in the first embodiment.

In the first embodiment, the execution of the lockup control (engagement state change control) is restricted during the torque reduction control (vehicle attitude control), and the execution of the torque reduction control is restricted during the lockup control. Thus, the execution period of the torque reduction control and the execution period of the lockup control are prevented from overlapping with each other. On the other hand, in the second embodiment, the lockup control is restricted in a situation where when a given lateral acceleration is applied to the vehicle, such as the torque reduction control is executed. As a result (i.e., inevitably), the execution period of the lockup control is prevented from overlapping with the execution period of torque reduction control.

Figure 9:
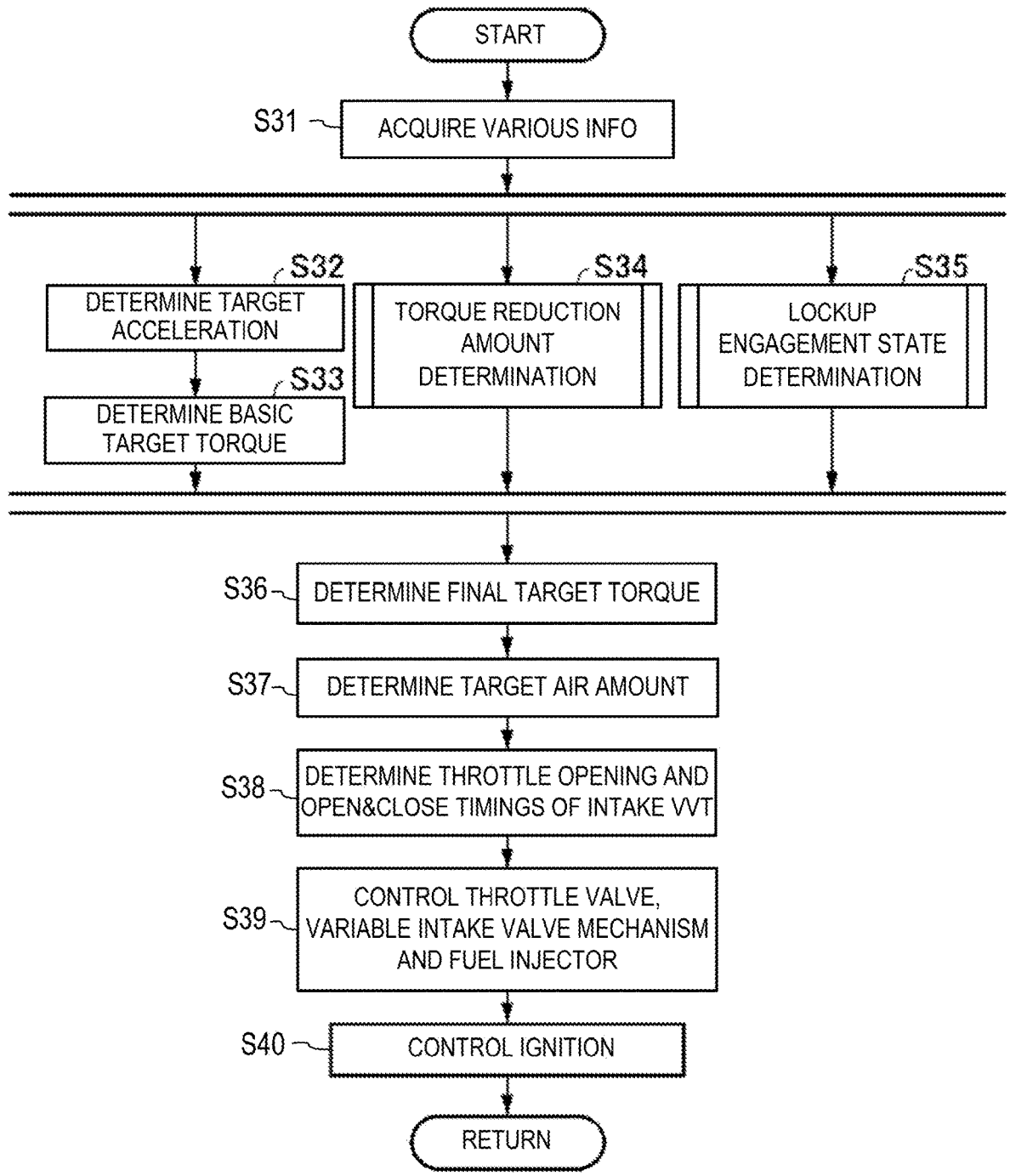
FIG. 9 is a flowchart illustrating a control executed by the vehicle control device according to a second embodiment of the present disclosure.
Figure 10:
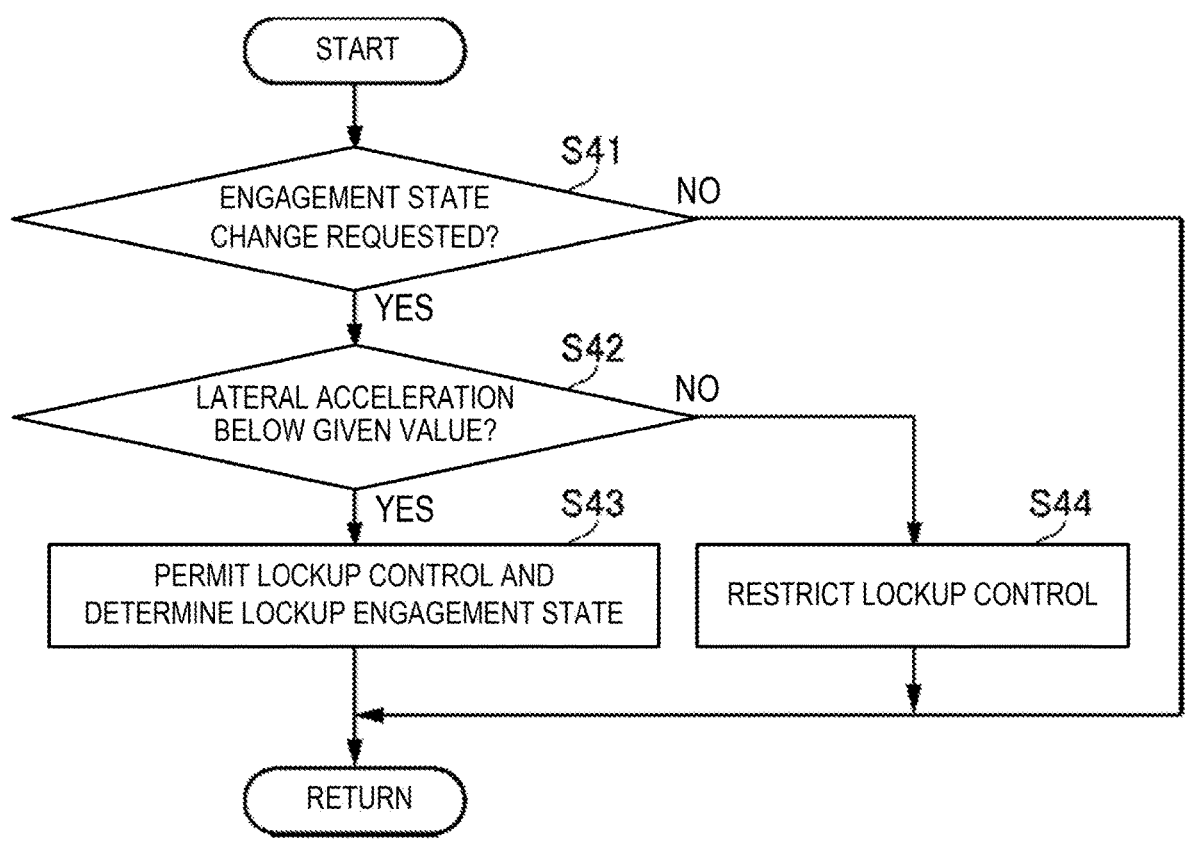
FIG. 10 is a flowchart illustrating a lockup engagement state determination according to the second embodiment of the present disclosure.

The control of the second embodiment is described in detail with reference to FIGS. 9 and 10. FIG. 9 is a flowchart illustrating the control executed by the vehicle control device according to the second embodiment of the present disclosure. FIG. 10 is a flowchart illustrating a lockup engagement state determination in which a lockup engagement state is determined by the vehicle control device according to the second embodiment of the present disclosure.

Since processing steps S31 to S34 and S37 to S40 of FIG. 9 are the same as the processing steps S1 to S4 and S10 to S13, respectively, the description thereof is omitted. Here, the processing steps S35 and S36 are mainly described.

First at S35, in parallel to the processing steps S32 to S34, the controller 50 performs the lockup engagement state determination in which the engagement state (i.e., engagement ratio/slip ratio) of the lockup clutch 202f is determined based on the vehicle speed and the accelerator opening. This lockup engagement state determination is described with reference to FIG. 10.

As illustrated in FIG. 10, when the lockup engagement state determination is started, at S41, the controller 50 determines whether to change the engagement state of the lockup clutch 202f based on the current vehicle speed and the accelerator opening by referring to the lockup control map illustrated in FIG. 4. In other words, whether the engagement state of the lockup clutch 202f is requested to be changed is determined. As a result, if the engagement state is not requested to be changed (S41: NO), the process is terminated.

On the other hand, if the engagement state of the lockup clutch 202f is requested to be changed (S41: YES), the process proceeds to S42 where the controller 50 determines whether the lateral acceleration applied to the vehicle is below a given value. Here, whether the vehicle is in a stable state is determined. In this embodiment, in order to change the engagement state of the lockup clutch 202f in the stable state of the vehicle, changing the engagement state is permitted only when the lateral acceleration is below the given value, and changing the engagement state is prohibited when the lateral acceleration is above the given value. In this manner, the stable change control of the engagement state of the lockup clutch 202f is achieved.

For this, the given value for determining the lateral acceleration at S42 may be set according to a boundary value of the lateral acceleration which is achievable of the stable change control of the engagement state of the lockup clutch 202f. For example, the lateral acceleration according to the threshold $T_s$ (see FIG. 7) for determining the steering speed described above may be applied to the given value. In a preferred example, a lateral acceleration slightly lower than the lateral acceleration applied to the vehicle when the steering operation is performed at the steering speed $T_s$ is applied to the given value. Further, the lateral acceleration may be detected by providing a lateral angular velocity sensor in the vehicle. Note that at S42, the determination is performed based on the lateral acceleration; however, in another example, the determination may be performed based on the yaw rate or the steering speed, etc. instead of the lateral acceleration.

If the lateral acceleration is below the given value (S42: YES), the process proceeds to S43 where the controller 50 permits the execution of the lockup control and determines the engagement state of the lockup clutch 202f. For example, the controller 50 determines the engagement state (i.e., engagement ratio/slip ratio) of the lockup clutch 202f to be set, based on the vehicle speed and the accelerator opening by referring to the lockup control map illustrated in FIG. 4. On the other hand, if the lateral acceleration is above the given value (S42: NO), the process proceeds to S44 where the controller 50 restricts the execution of the lockup control. In this case, the controller 50 does not determine the engagement state of the lockup clutch 202f.

Returning to FIG. 9, after the processings of S32 to S35, at S36, the controller 50 determines the final target torque. For example, the controller 50 determines the final target torque as follows.

In a situation where the engagement state of the lockup clutch 202f is determined in the lockup engagement determination at S35, the lateral acceleration is below the given value (S42: YES) and the given steering angle and speed, which are the execution condition of the torque reduction control, are not achieved. Therefore, the torque reduction control is not executed, in other words, the torque reduction amount is not determined in the torque reduction amount determination at S34. In this case, the controller 50 determines the basic target torque determined at S33 as the final target torque.

On the contrary, in a situation where the torque reduction amount is determined in the torque reduction amount determination at S34, the given steering angle and speed are achieved and the lateral acceleration exceeds the given value (S42: NO). Therefore, the lockup control is restricted (S44), in other words, the engagement state of the lockup clutch 202f is not determined at S35. In this case, the controller 50 determines the final target torque by subtracting the torque reduction amount determined in the torque reduction amount determination at S34 from the basic target torque determined at S33.

On the other hand, if the torque reduction amount is not determined in the torque reduction amount determination at S34 and the engagement state of the lockup clutch 202f is not determined in the lockup engagement state determination at S35, the controller 50 determines the basic target torque determined at S33 as the final target torque as it is.

Next, at S37 to S40, the controller 50 performs similar processings to S10 to S13 of FIG. 5 so that the engine 10 outputs the final target torque determined at S36.

Also according to the second embodiment of the present disclosure described above, the overlap between the execution period of the torque reduction control (vehicle attitude control) and the execution period of the lockup control is suitably prevented. Therefore, according to the second embodiment, it is prevented that the suitable torque reduction for controlling the vehicle attitude ("torque reduction" used here means a reduction in the torque applied to the vehicle wheels) cannot be performed by performing the lockup control during the torque reduction control. Thus, also according to the second embodiment, the vehicle attitude is controlled with high responsiveness to the steering operation by the driver. Additionally, according to the second embodiment, the change in the engagement state of the lockup clutch 202f is reliably prevented from becoming delayed or becoming unstable due to the torque reduction control executed during the lockup control.

<Modifications>

Hereinafter, modifications of the embodiment described above are described.

Although in the above embodiment the execution of the lockup control (engagement state change control) is completely prohibited while the torque reduction control (vehicle attitude control) is executed, the present disclosure is not particularly limited to this embodiment. In short, when the torque reduction control is executed, the lockup control may at least be restricted than when the torque reduction control is not executed. In one example, without prohibiting the lockup control, the execution timing of the lockup control may be delayed. In this example, the lockup control may be started after a given period of time from issuance of the execution request for the lockup control or when a change rate of the torque reduction amount, etc. falls below a given value after the execution request for the lockup control is issued. In another example, a control of regulating a changing speed (or a change amount) of the engagement state of the lockup clutch 202f by the lockup control to below a given value may be executed. In still another example, both the delaying of the execution timing of the lockup control and the regulation of the changing speed (or the change amount) of the engagement state of the lockup clutch 202f may be performed.

Also according to the modifications described above, the torque reduction for controlling the vehicle attitude is secured by suitably restricting the lockup control during the torque reduction control, and the steering stability etc. are surely improved by the torque reduction control.

In still further another example, the lockup control during the torque reduction control may be restricted by changing the releasing range and the engaging range defined in the lockup control map (see FIG. 4) for changing the engagement state of the lockup clutch 202f. This modification is described in detail with reference to FIG. 11.

Figure 11:
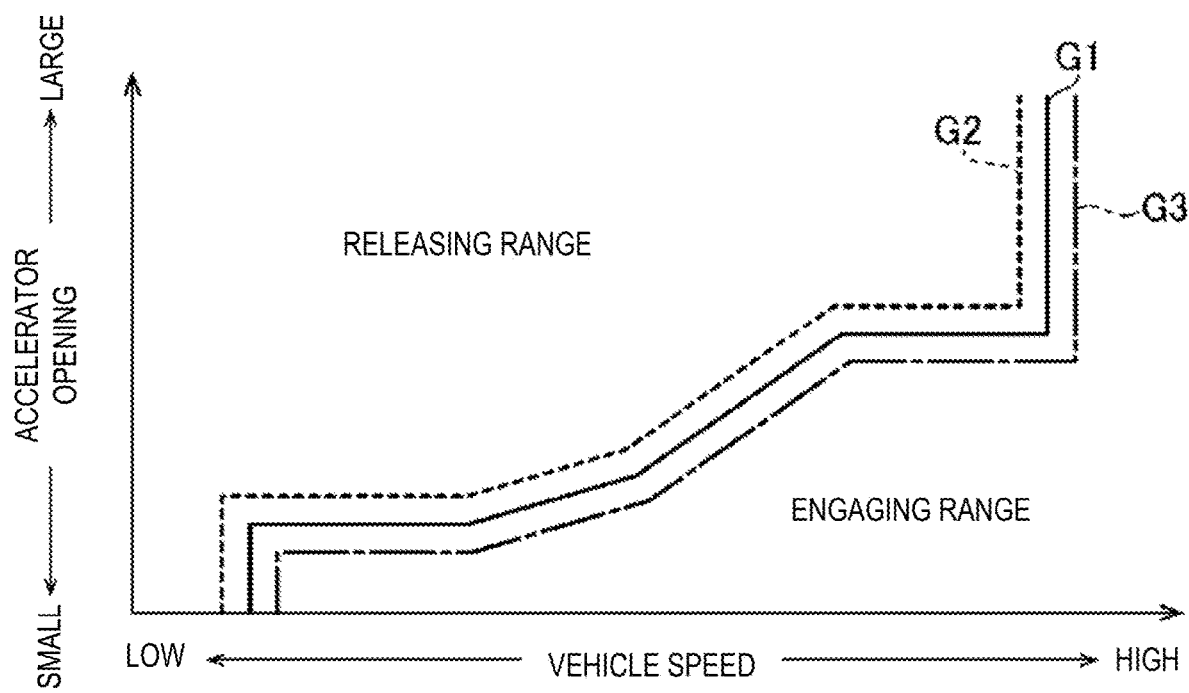
FIG. 11 is a chart illustrating a lockup control map according to a modification of the embodiment of the present disclosure.

FIG. 11 is a chart illustrating a lockup control map according to one modification of the embodiment of the present disclosure. In FIG. 11, the horizontal axis indicates the vehicle speed and the vertical axis indicates the accelerator opening. Further, a graph G1 indicated by a solid line corresponds to a normal control map applied when the torque reduction control is not executed (similar to that illustrated in FIG. 4). On the other hand, a graph G2 indicated by a dashed line corresponds to a control map in which the engaging range is enlarged (in other words, the releasing range is narrowed), and a graph G3 indicated by a one-dotted chain line corresponds to a control map in which the releasing range is enlarged (in other words, the engaging range is narrowed).

In the modification, when the execution request for the lockup control is issued during the torque reduction control, the current operating range of the vehicle on the lockup control map is enlarged so that the state of the lockup clutch 202f is not easily changed. For example, in a case where the current state of the lockup clutch 202f is in the engaged state, that is, the current operating range is the engaging range when the execution request for the lockup control is issued, the lockup control map is changed to enlarge the engaging range (see the graph G2). On the other hand, in a case where the current state of the lockup clutch 202f is in the released state, that is, the current operating range is the releasing range when the execution request for the lockup control is issued, the releasing range is enlarged (see the graph G3).

Even with such a modification, the torque reduction for controlling the vehicle attitude is secured by suitably restricting the lockup control during the torque reduction control, and the steering stability is surely improved by the torque reduction control.

In the above embodiment, the execution of the torque reduction control (vehicle attitude control) is uniformly restricted while the lockup control (engagement state change control) is executed. In another example, the execution of the torque reduction control may be restricted only when at least one of the changing speed (or the change amount) of the engagement state of the lockup clutch 202f by the lockup control and a difference between a target value and an actual value of the engagement state of the lockup clutch 202f by the lockup control is above a given value. In such a modification, when the change in the engagement state of the lockup clutch 202f in the lockup control is small, the execution of the torque reduction control is permitted. In this manner, the improvement of the steering stability, etc. by the torque reduction control even during the lockup control is achieved.

Note that when applying the above modification, the engagement state (that is, the engagement ratio/slip ratio) of the lockup clutch 202f may be determined based on a difference between the engine speed and the rotational speed of the turbine 202c, the hydraulic pressure command value for the L/U hydraulic solenoid valve 291 which drives the lockup clutch 202f, etc.

In the above embodiment, the lockup control map defined by the vehicle speed and the accelerator opening is used (see FIG. 4); however, such a lockup control map is not limited to be defined by the vehicle speed and the accelerator opening themselves. For example, instead of the vehicle speed, the lockup control map may be defined using the engine speed, etc. which are parameters related to the vehicle speed (vehicle speed related value). Further, instead of the accelerator opening, the lockup control map may be defined using the throttle opening, the fuel injection amount, the engine load, the charging efficiency, etc., which are parameters related to the accelerator opening (accelerator opening related value).

In the above embodiment, the vehicle equipped with the control device is also equipped with the engine 10 which drives the drive wheels. In another example, the vehicle control device according to the present disclosure may be applied to a vehicle equipped with a motor which drives the drive wheels with power supplied from a battery or a capacitor (typically, a hybrid vehicle or an electric vehicle). In this example, the controller 50 executes a control of reducing a torque of the motor as the torque reduction control (vehicle attitude control). Further in this example, the motor corresponds to "drive source" and each of various actuators for adjusting the torque (output) of the motor corresponds to "drive source control mechanism."

In the above embodiment, the present disclosure is applied for a case where the engagement state of the lockup clutch 202f of the torque converter 202 is changed. The present disclosure may also be applied for a case where the engagement state is changed in terms of various other engageable elements (typically, clutches) provided in a driving force transmission mechanism which transmits a torque from the drive source described above to the vehicle wheels. Also in this case, the overlap between the execution period of the engagement state change control for changing the engagement state of the engagement element and the execution period of the torque reduction control may be prevented.

In the above embodiment, the torque reduction control (vehicle attitude control) is executed based on the steering angle and the steering speed. In another example, the torque reduction control may be executed based on the yaw rate or the lateral acceleration instead of the steering angle and the steering speed. Each of the steering angle, the steering speed, the yaw rate, and the lateral acceleration corresponds to one example of "steering angle related value."

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake Passage
5 Throttle Valve
10 Engine
13 Fuel Injector
14 Ignition Plug
18 Variable Intake Valve Mechanism
25 Exhaust Passage
30 Accelerator Opening Sensor
39 Vehicle Speed Sensor
40 Steering Angle Sensor
50 Controller
51 Engagement State Change Controlling Module
53 Vehicle Attitude Controlling Module
55 Engagement State Change Restricting Module
57 Vehicle Attitude Control Restricting Module
100 Engine System
200 Automatic Transmission (Driving Force Transmission Mechanism)
202 Torque Converter
202f Lockup Clutch
205 Transmission Mechanism

What is claimed is:

1. A vehicle control device for a vehicle, the vehicle comprising:
   a drive source for generating torque as a driving force that causes the vehicle to travel;
   a drive source control mechanism for controlling the torque generation by the drive source;
   a driving force transmission mechanism for transmitting the generated torque to vehicle wheels; and
   an engageable element provided in the driving force transmission mechanism;
   wherein the control device comprises:
   a processor configured to execute:
      an engagement state change controlling module for executing an engagement state change control in which an engagement state of the engageable element is changed;
      a vehicle attitude controlling module for controlling an attitude of the vehicle by driving the drive source control mechanism to reduce the generated torque so as to decelerate the vehicle when a condition is satisfied, the condition being that the vehicle is traveling and a steering angle related value that is related to a steering angle of a steering device increases; and
      an engagement state change restricting module for restricting the execution of the engagement state change control while the vehicle attitude control is executed.

2. The vehicle control device of claim 1, wherein the engagement state change restricting module performs at least one of delaying an execution timing of the engagement state change control, prohibiting the engagement state change control, regulating a changing speed of the engagement state in the engagement state change control, and regulating a change amount of the engagement state in the engagement state change control.

3. The vehicle control device of claim 2, wherein the vehicle attitude controlling module reduces the torque based on the engagement state of the engageable element when the condition is satisfied.

4. The vehicle control device of claim 3, wherein
   the driving force transmission mechanism includes a torque converter provided with a lockup clutch, and
   the engageable element is the lockup clutch.

5. The vehicle control device of claim 4, wherein the engagement state change controlling module executes the engagement state change control based on a vehicle speed related value that is a parameter related to a vehicle speed and an accelerator opening related value that is a parameter related to an accelerator opening.

6. The vehicle control device of claim 5, wherein
   by using a control map in which a plurality of operating ranges of the vehicle for changing the engagement state of the engageable element according to the vehicle speed related value and the accelerator opening related value are defined, the engagement state change controlling module executes the engagement state change control based on a currently applied operating range that is one of the plurality of operating ranges, and
   the engagement state change restricting module restricts the execution of the engagement state change control by enlarging the currently applied operating range on the control map.

7. The vehicle control device of claim 6, wherein
   the vehicle includes a steering angle sensor for detecting the steering angle of the steering device, and
   the vehicle attitude controlling module executes the vehicle attitude control when the vehicle is traveling and a changing speed of the detected steering angle is above a given value.

8. The vehicle control device of claim 1, wherein the vehicle attitude controlling module reduces the torque based on the engagement state of the engageable element when the condition is satisfied.

9. The vehicle control device of claim 8, wherein
   the driving force transmission mechanism includes a torque converter provided with a lockup clutch, and
   the engageable element is the lockup clutch.

10. The vehicle control device of claim 9, wherein the engagement state change controlling module executes the engagement state change control based on a vehicle speed related value that is a parameter related to a vehicle speed and an accelerator opening related value that is a parameter related to an accelerator opening.

11. The vehicle control device of claim 10, wherein
   by using a control map in which a plurality of operating ranges of the vehicle for changing the engagement state of the engageable element according to the vehicle speed related value and the accelerator opening related value are defined, the engagement state change controlling module executes the engagement state change control based on a currently applied operating range that is one of the plurality of operating ranges, and the engagement state change restricting module restricts the execution of the engagement state change control by enlarging the currently applied operating range on the control map.

12. The vehicle control device of claim 1, wherein
the driving force transmission mechanism includes a torque converter provided with a lockup clutch, and
the engageable element is the lockup clutch.

13. The vehicle control device of claim 12, wherein the engagement state change controlling module executes the engagement state change control based on a vehicle speed related value that is a parameter related to a vehicle speed and an accelerator opening related value that is a parameter related to an accelerator opening.

14. The vehicle control device of claim 13, wherein
by using a control map in which a plurality of operating ranges of the vehicle for changing the engagement state of the engageable element according to the vehicle speed related value and the accelerator opening related value are defined, the engagement state change controlling module executes the engagement state change control based on a currently applied operating range that is one of the plurality of operating ranges, and
the engagement state change restricting module restricts the execution of the engagement state change control by enlarging the currently applied operating range on the control map.

15. The vehicle control device of claim 1, wherein the engagement state change controlling module executes the engagement state change control based on a vehicle speed related value that is a parameter related to a vehicle speed and an accelerator opening related value that is a parameter related to an accelerator opening.

16. The vehicle control device of claim 15, wherein
by using a control map in which a plurality of operating ranges of the vehicle for changing the engagement state of the engageable element according to the vehicle speed related value and the accelerator opening related value are defined, the engagement state change controlling module executes the engagement state change control based on a currently applied operating range that is one of the plurality of operating ranges, and
the engagement state change restricting module restricts the execution of the engagement state change control by enlarging the currently applied operating range on the control map.

17. The vehicle control device of claim 1, wherein
the vehicle includes a steering angle sensor for detecting the steering angle of the steering device, and
the vehicle attitude controlling module executes the vehicle attitude control when the vehicle is traveling and a changing speed of the detected steering angle is above a given value.

18. A vehicle control device for a vehicle, the vehicle comprising:
a drive source for generating torque as a driving force that causes the vehicle to travel;
a drive source control mechanism for controlling the torque generation by the drive source;
a driving force transmission mechanism for transmitting the generated torque to vehicle wheels; and
an engageable element provided in the driving force transmission mechanism;
wherein the control device comprises:
a processor configured to execute:
an engagement state change controlling module for executing an engagement state change control in which an engagement state of the engageable element is changed;
a vehicle attitude controlling module for controlling an attitude of the vehicle by driving the drive source control mechanism to reduce the generated torque so as to decelerate the vehicle, when a condition is satisfied, the condition being that the vehicle is traveling and a steering angle related value that is related to a steering angle of a steering device increases; and
a vehicle attitude control restricting module for restricting the execution of the vehicle attitude control while the engagement state change control is executed.

19. The vehicle control device of claim 18, wherein the vehicle attitude control restricting module restricts the execution of the vehicle attitude control when at least one of a changing speed of the engagement state in the engagement state change control, a change amount of the engagement state in the engagement state change control, and a difference between a target value and an actual value of the engagement state by the engagement state change control, is above a given value.

20. A vehicle control device for a vehicle, the vehicle comprising:
a drive source for generating torque as a driving force that causes the vehicle to travel;
a drive source control mechanism for controlling the torque generation by the drive source;
a driving force transmission mechanism for transmitting the generated torque to vehicle wheels; and
an engageable element provided in the driving force transmission mechanism;
wherein the control device comprises:
a processor configured to execute:
an engagement state change controlling module for executing an engagement state change control in which an engagement state of the engageable element is changed;
a vehicle attitude controlling module for controlling an attitude of the vehicle by driving the drive source control mechanism to reduce the generated torque so as to decelerate the vehicle, when a condition is satisfied, the condition being that the vehicle is traveling and a steering angle related value that is related to a steering angle of a steering device increases; and
a period overlap preventing module for preventing an overlap between an execution period of the vehicle attitude control and an execution period of the engagement state change control.

* * * * *